(12) United States Patent
Engles et al.

(10) Patent No.: US 10,714,084 B2
(45) Date of Patent: Jul. 14, 2020

(54) ARTIFICIAL INTELLIGENCE BASED SERVICE IMPLEMENTATION

(71) Applicant: ACCENTURE GLOBAL SOLUTIONS LIMITED, Dublin (IE)

(72) Inventors: Edward Engles, Washington, DC (US); John D. Bolze, Rockville, MD (US)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 0 days.

(21) Appl. No.: 15/892,930

(22) Filed: Feb. 9, 2018

(65) Prior Publication Data

US 2019/0251959 A1 Aug. 15, 2019

(51) Int. Cl.

| | |
|---|---|
| *G10L 15/22* | (2006.01) |
| *H04M 3/51* | (2006.01) |
| *H04M 3/527* | (2006.01) |
| *H04M 3/523* | (2006.01) |
| *G06N 3/00* | (2006.01) |
| *G10L 15/18* | (2013.01) |
| *H04M 3/58* | (2006.01) |
| *G10L 15/08* | (2006.01) |

(52) U.S. Cl.
CPC .............. *G10L 15/22* (2013.01); *G06N 3/006* (2013.01); *G10L 15/1815* (2013.01); *H04M 3/5166* (2013.01); *H04M 3/523* (2013.01); *H04M 3/527* (2013.01); *H04M 3/58* (2013.01); *G10L 2015/088* (2013.01); *G10L 2015/223* (2013.01); *H04M 2201/18* (2013.01); *H04M 2201/41* (2013.01); *H04M 2203/2011* (2013.01); *H04M 2203/2038* (2013.01)

(58) Field of Classification Search
CPC .............. G10L 15/22; G10L 2015/228; G06Q 10/0633
See application file for complete search history.

(56) References Cited

U.S. PATENT DOCUMENTS

| | | | |
|---|---|---|---|
| 9,559,993 B2* | 1/2017 | Palakovich | |
| 2001/0047261 A1* | 11/2001 | Kassan | G10L 15/30 704/270 |
| 2002/0032591 A1* | 3/2002 | Mahaffy | G07F 9/02 709/202 |
| 2002/0046030 A1* | 4/2002 | Haritsa | G10L 17/26 704/255 |

(Continued)

OTHER PUBLICATIONS

Aiken, Peter. Microsoft computer dictionary. Microsoft Press, 2002. (Year: 2002).*

*Primary Examiner* — Brian L Albertalli
(74) *Attorney, Agent, or Firm* — Mannava & Kang, P.C.

(57) ABSTRACT

According to an example, with respect to artificial intelligence based service implementation, a voice call may be analyzed to generate voice data. The voice data may be converted to text data, which may be analyzed to identify keywords. Based on an analysis of the identified keywords, a user of a plurality of users may be identified. A user assistance flow of a plurality of user assistance flows that corresponds to a determined intent of the identified user may be ascertained. The voice call may be transferred to a digital assistant that may provide artificial intelligence based assistance to the identified user based on the user assistance flow that corresponds to the determined intent.

20 Claims, 12 Drawing Sheets

(56) References Cited

U.S. PATENT DOCUMENTS

| | | | |
|---|---|---|---|
| 2002/0178019 A1* | 11/2002 | Anderson | H04W 4/12 709/200 |
| 2006/0215824 A1* | 9/2006 | Mitby | G10L 15/22 379/100.05 |
| 2012/0016678 A1 | 1/2012 | Gruber et al. | |
| 2013/0080362 A1* | 3/2013 | Chang | G06Q 30/0255 706/21 |
| 2013/0111487 A1 | 5/2013 | Cheyer et al. | |
| 2014/0044243 A1 | 2/2014 | Monegan et al. | |
| 2014/0136187 A1* | 5/2014 | Wolverton | G10L 15/22 704/9 |
| 2014/0222436 A1 | 8/2014 | Courtney, III et al. | |
| 2014/0229405 A1* | 8/2014 | Govrin | G06Q 40/02 706/11 |
| 2014/0314225 A1 | 10/2014 | Riahi et al. | |
| 2015/0254675 A1* | 9/2015 | Kannan | G06Q 30/02 705/304 |
| 2015/0271321 A1 | 9/2015 | Gainsboro et al. | |
| 2015/0310445 A1* | 10/2015 | Chan | G06Q 10/06316 705/7.26 |
| 2017/0054848 A1* | 2/2017 | Meng | G06Q 30/02 |
| 2017/0186018 A1* | 6/2017 | Nandi | G06Q 30/016 |
| 2017/0214779 A1* | 7/2017 | Moran | H04M 1/642 |
| 2017/0277993 A1* | 9/2017 | Beaver | G06F 17/2785 |
| 2017/0300831 A1* | 10/2017 | Gelfenbeyn | G06N 3/006 |
| 2018/0115645 A1* | 4/2018 | Iyer | G10L 15/26 |
| 2018/0190274 A1* | 7/2018 | Kirazci | G10L 15/1815 |
| 2018/0261223 A1* | 9/2018 | Jain | G10L 15/22 |
| 2018/0341396 A1* | 11/2018 | Yaseen | G06Q 10/10 |
| 2018/0349446 A1* | 12/2018 | Triolo | G06F 16/252 |
| 2019/0095927 A1* | 3/2019 | Shimpi | G06N 5/025 |
| 2019/0130915 A1* | 5/2019 | Nitz | G10L 15/1822 |
| 2019/0132307 A1* | 5/2019 | Pitchaimani | G06F 21/41 |
| 2019/0147878 A1* | 5/2019 | Kirazci | G10L 15/1815 |

\* cited by examiner

| | Add Change Plan | Bill Explanation | Change MTN | Port Status | Travel Pass | Upgrade Eligibility |
|---|---|---|---|---|---|---|
| Add Change Plan | 5673 | 860 | 1092 | 665 | 1247 | 574 |
| Bill Explanation | 733 | 7625 | 202 | 1207 | 178 | 548 |
| Change MTN | 188 | 153 | 5351 | 923 | 99 | 861 |
| Port Status | 711 | 707 | 1141 | 8306 | 122 | 1064 |
| Travel Pass | 623 | 210 | 233 | 280 | 1050 | 754 |
| Upgrade Eligibility | 818 | 581 | 978 | 978 | 535 | 3502 |
| Balanced Accuracy | 77.15% | 84.08% | 77.08% | 78.73% | 64.04% | 69.50% |

*Anomalies are highlighted and require further analysis

ARTIFICIAL INTELLIGENCE BASED SERVICE IMPLEMENTATION

BACKGROUND

In the area of customer service, a customer, hereinafter referred to as a user, may contact a customer service center for assistance. For example, the user may contact the customer service center for assistance on a product that is supported by the customer service center. At the customer service center, the user may be prompted to select from several preset menu options, and upon the selection of a menu option, the user may be directed to other menu options. The preset menu options may not include an option that is needed by the user to address an inquiry, in which case, the user may finally select, when prompted, an option to discuss the inquiry with a live user assistant.

BRIEF DESCRIPTION OF DRAWINGS

Features of the present disclosure are illustrated by way of examples shown in the following figures. In the following figures, like numerals indicate like elements, in which

FIG. 7 illustrates an example of multinomial logistic regression results to illustrate operation of the artificial intelligence based service implementation system of FIG. 1, according to an example of the present disclosure;

DETAILED DESCRIPTION

Figure 1:
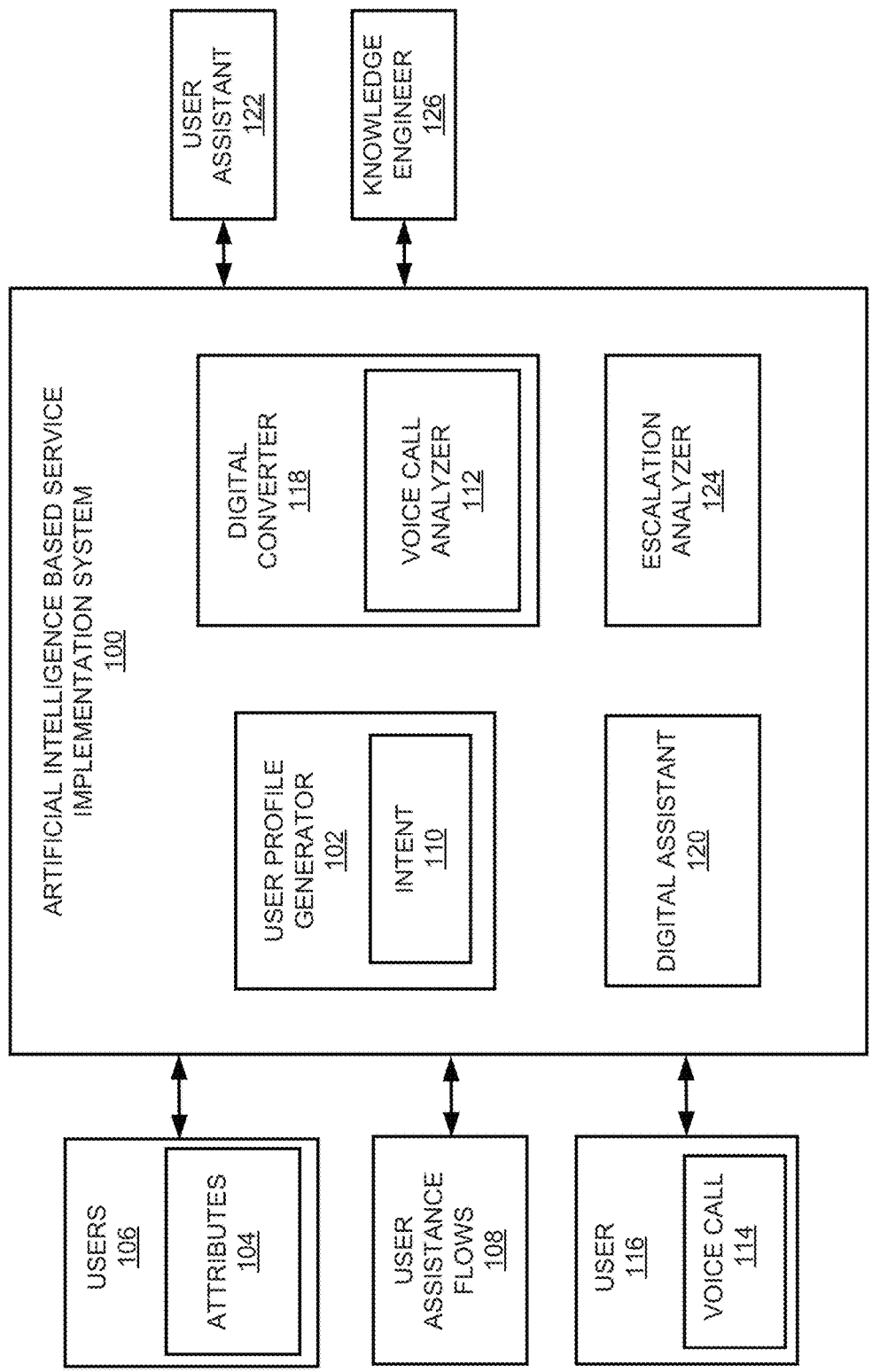
FIG. 1 illustrates an architecture of an artificial intelligence based service implementation system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Artificial intelligence based service implementation systems, methods for artificial intelligence based service implementation, and non-transitory computer readable media having stored thereon machine readable instructions for artificial intelligence based service implementation are disclosed herein. The systems, methods, and non-transitory computer readable media disclosed herein provide for prediction of an intent of a call, such as a voice call, from a user to a customer service center, and the implementation of an artificial intelligence based digital experience to the user upon confirmation of the intent of the call.

With respect to customer service, as disclosed herein, a user may contact a customer service center for assistance. For example, the user may contact the customer service center for assistance on a product that is supported by the customer service center. An example of a product includes a smartphone that is supported by the customer service center, or any device or service generally. At the customer service center, the user may be prompted to select from several preset menu options, and upon the selection of a menu option, the user may be directed to other menu options. Examples of preset menu options include an option to pay a bill related to the smartphone, an option to add a service to the smartphone, etc. The preset menu options may not include an option that is needed by the user to address an inquiry, in which case, the user may finally select, when prompted, an option to discuss the inquiry with a live user assistant. For example, the preset menu options may not include an option to check an international roaming status of the smartphone. In this regard, several minutes may elapse between the time the user initiates the call with the customer service center, and the time the user is connected to the live user assistant. In the meantime, several other users may have initiated such calls to the customer service center, thus resulting in relatively high network traffic and bandwidth consumption with respect to calls placed to and handled by the customer service center. The relatively high network traffic and bandwidth consumption may lead to dropped calls, which may add technical challenges to the ability to successfully answer multiple calls, maintenance of adequate bandwidth by reducing unnecessary bandwidth utilization, etc.

In order to address at least the aforementioned technical challenges with respect to answering of multiple calls, maintenance of adequate bandwidth, etc., the systems, methods, and non-transitory computer readable media disclosed herein provide for reduction in a time needed to handle a call, such as a voice call, by predicting an intent of a call from a user to a customer service center, and implementing an artificial intelligence based digital experience to the user upon confirmation of the intent of the call. In this regard, prediction of the intent of a call from a user and implementation of an artificial intelligence based digital experience to the user may reduce and/or virtually eliminate the time spent by a user, for example, traversing through preset menu options. Thus, instead of having to traverse through preset menu options, a user may call in to a customer service center with the intent of speaking to a live user assistant about a topic. The systems, methods, and non-transitory computer readable media disclosed herein may predict why the user has called. That is, specific to the user and a profile for the user that is used to predict the intent of the user, the systems, methods, and non-transitory computer readable media disclosed herein may offer the user a digital experience that mimics the live user assistant.

For example, for the systems, methods, and non-transitory computer readable media disclosed herein, a user may place a voice call that may be directed to a voice call analyzer. Before the user may perform or otherwise invoke an operation with respect to the voice call analyzer, the systems, methods, and non-transitory computer readable media disclosed herein may analyze what the user has done previously with respect to the voice call analyzer, and based on further knowledge with respect to other attributes of the user, the systems, methods, and non-transitory computer readable media disclosed herein may predict the intent of the user to offer a digital experience that mimics the live user assistant. For the example of the smartphone, the systems, methods, and non-transitory computer readable media disclosed herein may predict the intent of the user for checking an international roaming status of the smartphone.

The intent of the user may be determined based on an analysis of a plurality of attributes for a plurality of users. For example, the attributes may include demographics associated with the plurality of users, channel interaction data associated with the plurality of users, where the channel interaction data may identify patterns of interaction of the plurality of users with websites associated with a specified product, etc.

The systems, methods, and non-transitory computer readable media disclosed herein may further implement a self-service artificial intelligence based conversation with the user. For example, the user may experience the self-service artificial intelligence based conversation on a smartphone, a personal computer, a virtual display device, and other such devices. In this regard, the systems, methods, and non-transitory computer readable media disclosed herein may effectively move a voice call placed by a user to a customer service center to the artificial intelligence based solution implemented by the systems, methods, and non-transitory computer readable media disclosed herein.

According to examples, the voice call placed by the user may be placed to perform a transaction with the customer service center. Alternatively or additionally, the voice placed by the user may be placed to conduct a conversation with a live user assistant. In this regard, the systems, methods, and non-transitory computer readable media disclosed herein may include analytics as disclosed herein to perform such a transaction and/or conversation with the user.

Yet further, the systems, methods, and non-transitory computer readable media disclosed herein may determine appropriate communication channels to respond to the user. For example, the communication channel may be a chat function to explain an issue to a user, or the communication channel may be a newly configured web portal to provide information to the user, or the communication channel may be an existing web portal to provide information to the user.

In some examples, elements of the artificial intelligence based service implementation system may be machine readable instructions stored on a non-transitory computer readable medium. In this regard, the artificial intelligence based service implementation system may include or be a non-transitory computer readable medium. In some examples, the elements of the artificial intelligence based service implementation system may be hardware or a combination of machine readable instructions and hardware.

FIG. 1 illustrates an architecture of an artificial intelligence based service implementation system 100 (hereinafter "system 100"), according to an example of the present disclosure.

Referring to FIG. 1, the system 100 may include a user profile generator 102 that is executed by at least one hardware processor (e.g., the hardware processor 802 of FIG. 8, and/or the hardware processor 1104 of FIG. 11) to ascertain a plurality of attributes 104 for a plurality of users 106. The plurality of attributes 104 may be analyzed to generate a user profile for each of the plurality of users 106. According to examples, the attributes 104 may include demographics associated with the plurality of users 106, channel interaction data associated with the plurality of users, where the channel interaction data may identify patterns of interaction of the plurality of users 106 with websites associated with a specified product, etc. For example, the demographics may include age, location, gender, etc., associated with the plurality of users 106. Further, the channel interaction data may include different websites visited, and searches performed by the plurality of users 106 for a product such as a smartphone. Accordingly, a user profile for a user may include an age of 30, a gender of male, channel interaction data that includes browsing of a XYZ company website for upgrade eligibility for smartphones, etc.

The user profile generator 102 may generate, based on an analysis of the plurality of attributes 104 (i.e., included in the user profile) for the plurality of users 106, scores for a plurality of user assistance flows 108 for each of the plurality of users 106. For example, assuming that a user assistance flow includes an analysis of 20 attributes, the 20 attributes may be rated 1-100 depending on the degree by which they are met. Thereafter, an average score may be determined for all of the attributes to determine the score for a user assistant flow. Alternatively, the score for the user assistance flow may represent a weighted score that is determined based on weights applied to different attributes. For example, an attribute may be weighted based on an importance thereof. For example, an attribute pertaining to a location may include a weight of two (e.g., twice) compared to an attribute pertaining to age, etc. Thus, according to examples, the scores may include a score of 1-100 for the plurality of user assistance flows 108 for each of the plurality of users 106. Further, a user assistance flow may be described as a set of logical steps that are performed to address an inquiry a user, to perform a transaction, or generally, to perform a task or tasks that may otherwise be performed by a user assistant to assist a user.

The user profile generator 102 may determine an intent 110 for each of the plurality of users 106 by identifying, for each of the plurality of users 106, a user assistance flow of the plurality of user assistance flows 108 that corresponds to a highest score of the plurality of generated scores. For example, as disclosed herein, for a first user of the plurality of users, the intent 110 may be determined based on identification of an "upgrade eligibility inquiry" user assistance flow from a plurality of user assistance flows that include an "upgrade eligibility inquiry" user assistance flow, a "change mobile telephone network" user assistance flow, a "device payment" user assistance flow, a "routing" user assistance flow, a "tailored experience" user assistance flow, etc. For another user of the plurality of users, the intent 110 may be determined based on identification of a "change mobile telephone network" user assistance flow. Similarly, the intent 110 may be determined for each of the plurality of users 106.

A voice call analyzer 112 that is executed by the at least one hardware processor (e.g., the hardware processor 802 of FIG. 8, and/or the hardware processor 1104 of FIG. 11) may receive a voice call 114. The voice call analyzer 112 may implement, for example, interactive voice response (IVR) functionality to analyze the voice call 114 to generate voice data, and convert the voice data to text data. In this regard, the voice call analyzer 112 may utilize speech-to-text conversion to generate the voice data, and to convert the voice data to text data. Further, the voice call analyzer 112 may analyze the text data to identify keywords in the text data, and identify, based on an analysis of the identified keywords, a user 116 of the plurality of users 106, where the user 116 is associated with the voice call 114. For example, the keywords may include a name of the user 116, an address of the user 116, a password associated with the user 116, an account number associated with the user 116, etc.

With respect to the interactive voice response functionality, this functionality may allow the user 116 to interact with the voice call analyzer 112 via a telephone keypad or by speech recognition. Thereafter, an interactive voice response dialogue may be utilized by the user 116 to inquire, via the voice call analyzer 112, about services supported by the system 100, and to respond to various inquiries as disclosed herein.

A digital converter 118 that is executed by the at least one hardware processor (e.g., the hardware processor 802 of FIG. 8, and/or the hardware processor 1104 of FIG. 11) may generate, based on a determined intent 110 of the identified user 116, an inquiry to determine whether a purpose of the voice call 114 matches the determined intent 110. For example, the inquiry may indicate "Are you calling to inquire about eligibility to upgrade your phone?" (e.g., with respect to the "upgrade eligibility inquiry" user assistance flow).

Based on a determination that the purpose of the voice call 114 matches the determined intent 110 (e.g., the user is calling about eligibility to upgrade their phone with respect to the "upgrade eligibility inquiry" user assistance flow), the digital converter 118 may ascertain a user assistance flow (e.g., the "upgrade eligibility inquiry" user assistance flow) of the plurality of user assistance flows 108 that corresponds to the determined intent 110. Further, the digital converter 118 may cause the voice call to be transferred to a digital assistant 120 that is executed by the at least one hardware processor (e.g., the hardware processor 802 of FIG. 8, and/or the hardware processor 1104 of FIG. 11), for example, to perform the user assistance flow that corresponds to the determined intent 110.

According to examples, the digital converter 118 may generate a further inquiry to determine whether to transfer the voice call 114 to a live user assistant 122 (e.g., a live customer service representative) or to the digital assistant 120.

Based on a determination that the voice call 114 is to be transferred to the live user assistant, the digital converter 118 may cause the voice call to be transferred to the live user assistant 122. For example, if the user 116 requests to be transferred to the live user assistant 122, the digital converter 118 may cause the voice call to be transferred to the live user assistant 122.

Alternatively, based on a determination that the voice call 114 is to be transferred to the digital assistant 120, the digital converter 118 may cause the voice call 114 to be transferred to the digital assistant 120. For example, if the user 116 agrees to be transferred to the digital assistant 120, the digital converter 118 may cause the voice call 114 to be transferred to the digital assistant 120.

The digital assistant 120 may provide artificial intelligence based assistance to the identified user 116 based on the user assistance flow that corresponds to the determined intent 110. For example, the digital assistant 120 may provide artificial intelligence based assistance to the identified user 116 based on the "upgrade eligibility inquiry" user assistance flow that corresponds to the determined intent 110. In this regard, the digital assistant 120 may offer a digital experience that mimics the live user assistant 122.

According to examples, based on a determination that the purpose of the voice call 114 does not match the determined intent 110, the digital converter 118 may generate a further inquiry to ascertain an intent of the user 116. For example, the further inquiry may indicate "Are you calling to inquire about changing the mobile telephone network for your phone?" (e.g., with respect to the "change mobile telephone network" user assistance flow). In this regard, the digital converter 118 may ascertain another user assistance flow (e.g., the "change mobile telephone network" user assistance flow) of the plurality of user assistance flows 108 that corresponds to the ascertained intent of the user 116. In this regard, the another user assistance flow may represent a second highest score of the plurality of generated scores for the user 116. Thus, the intent of the user 116 may be ascertained by presenting the user with further inquiries (e.g., three inquiries), up to a threshold number (e.g., four) of highest scores. Once the intent of the user 116 is confirmed, the digital assistant 120 may provide artificial intelligence based assistance to the identified user 116 based on the another user assistance flow that corresponds to the ascertained intent of the user 116.

According to examples, in addition to offering a digital experience that mimics the live user assistant 122, the digital assistant 120 may utilize a communication channel that includes a chat function to explain an issue to the identified user 116 based on the user assistance flow that corresponds to the determined intent 110. For example, the digital assistant 120 may utilize a chat function to communicate with the user 116, for example, by providing text and/or graphical answers to the user 116.

According to examples, the digital assistant 120 may utilize a communication channel that includes a newly configured web portal to provide information to the identified user 116 based on the user assistance flow that corresponds to the determined intent 110. For example, the digital assistant 120 may utilize a newly configured web portal that includes a newly configured direct network link to allow the user 116 to obtain assistance. In this regard, the user 116 may be prompted by the digital assistant 120 to authorize and create the direct network link to allow the user 116 to obtain assistance. For example, the newly configured web portal may be utilized to control a functionality of a smartphone to assist the user 116.

According to examples, the digital assistant 120 may utilize a communication channel that includes an existing web portal to provide information to the identified user 116 based on the user assistance flow that corresponds to the determined intent 110. For example, the digital assistant 120 may utilize an existing web portal that includes an existing direct network link to allow the user 116 to obtain assistance. In this regard, the user 116 may be prompted by the digital assistant 120 to authorize usage of the existing direct network link to allow the user 116 to obtain assistance. For example, the existing web portal may be utilized to control a functionality of a smartphone to assist the user 116.

An escalation analyzer 124 that is executed by the at least one hardware processor (e.g., the hardware processor 802 of FIG. 8, and/or the hardware processor 1104 of FIG. 11) may ascertain, for the user assistance flow, an erroneous flow component of the user assistance flow. For example, assuming that the "upgrade eligibility inquiry" user assistance flow includes logical flow components to guide the user 116 to first identify their device, second identify their current service provider, third identify their contract type, but includes an error with respect to whether their upgrade eligibility is limited to the same brand of devices, the escalation analyzer 124 may ascertain, for the user assistance flow, the erroneous flow component with respect to the limitation on the upgrade eligibility to the same brand of devices. For example, the user 116 may indicate "why is my eligibility limited to the same brand of devices?" to prompt the escalation analyzer 124 to ascertain the error with respect to the erroneous flow component. In this regard, the escalation analyzer 124 may generate, for a knowledge engineer 126, an inquiry to resolve an error with respect to the erroneous flow component of the user assistance flow. For example, the escalation analyzer 124 may generate, for the knowledge engineer 126, an inquiry that indicates "should upgrade eligibility be limited to the same brand of devices?" to resolve an error with respect to the erroneous flow component of the user assistance flow.

The escalation analyzer 124 may ascertain, from the knowledge engineer 126, a response to the inquiry to resolve the error with respect to the erroneous flow component of the user assistance flow. For example, the knowledge engineer 126 may confirm that the upgrade eligibility is not limited to the same brand of devices.

Further, the escalation analyzer 124 may modify, based on the response to the inquiry to resolve the error, the user assistance flow. In this regard, the escalation analyzer 124 may modify, based on the response to the inquiry to resolve the error, the user assistance flow to include the flow component that prompts the user 116 with a variety of device brands that would meet the user's upgrade eligibility.

Figure 2:
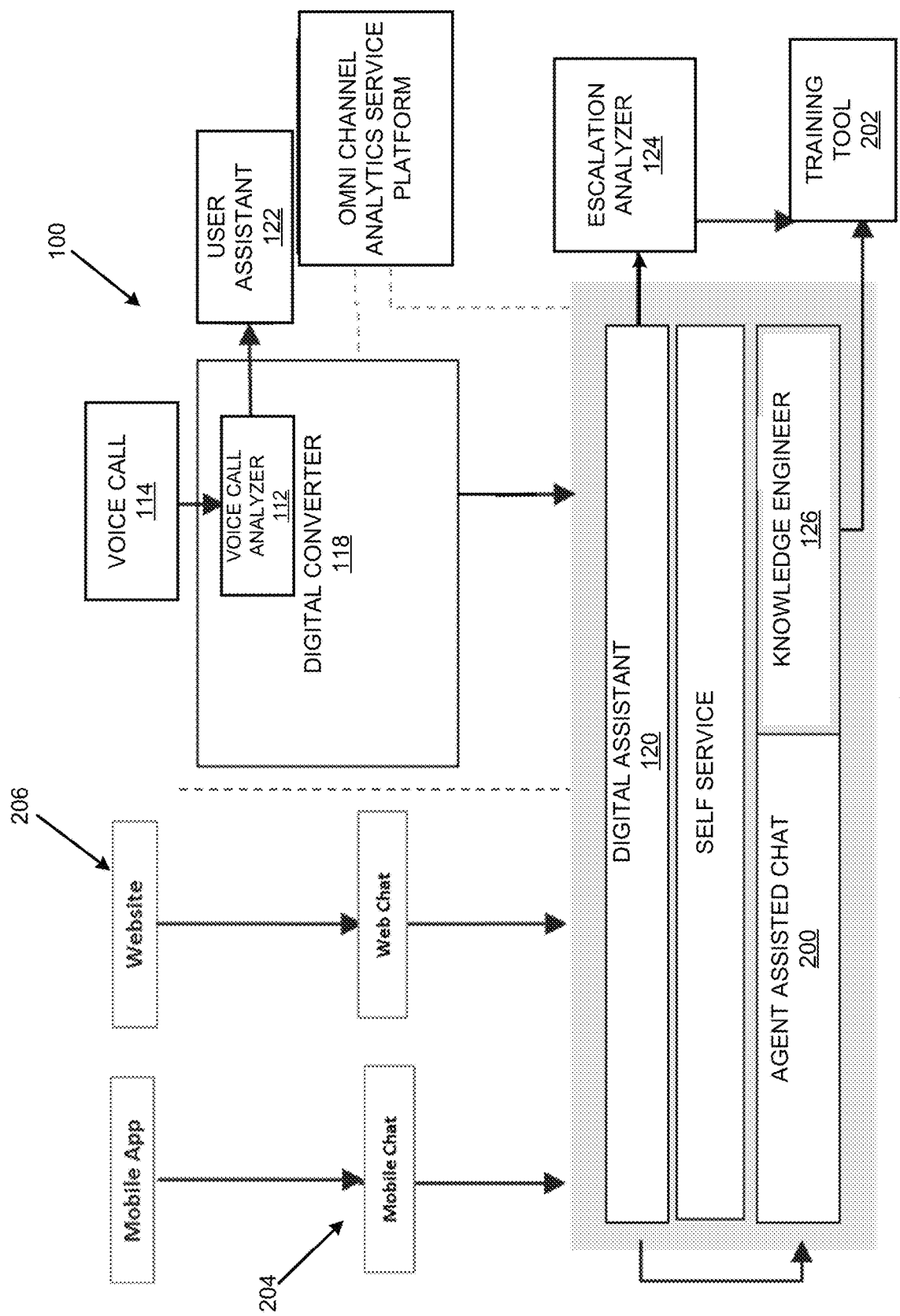
FIG. 2 illustrates further details of the architecture of the artificial intelligence based service implementation system of FIG. 1, according to an example of the present disclosure.

FIG. 2 illustrates further details of the architecture of the system 100, according to an example of the present disclosure.

Referring to FIGS. 1 and 2, as disclosed herein, the user profile generator 102 may ascertain the plurality of attributes 104 for the plurality of users 106. The plurality of attributes 104 may be analyzed to generate a user profile for each of the plurality of users 106. According to examples, the attributes 104 may include user demographics, user behavior, touch point across multiple channels, etc. These attributes (i.e., the user profile based on the attributes) may be used to determine, when a user calls to a user service center, based on the latest user profile, why the user is calling. In this regard, the attributes 104 may be used to predict an intent 110 of the user 116 as to why the user is calling the user service center. For example, the user 116 may have been on-line within the past one-half hour before calling in to the user service center. When on-line, the user 116 may have browsed for international travel passes to an overseas destination to determine whether their smartphone would work at the overseas destination. The user 116 may then call into a user service center. In this regard, the user profile generator 102 may predict, based on the user profile which includes the user's actions related to browsing for international travel passes, that the user 116 has called to inquire about use of their smartphone at the overseas destination. In this regard, the user may be prompted (e.g., by the digital converter 118) with an inquiry as to whether the user 116 is calling about smartphone usage at the overseas destination. Based on an affirmative response by the user 116, the user 116 may be prompted (e.g., by the digital assistant 120) with other inquiries related to smartphone usage at the overseas destination to guide the user towards obtaining services towards the smartphone usage at the overseas destination. Moreover, the inquiries may be relevant to the attributes of the specific smartphone and smartphone service provider being utilized by the user.

According to another example, assuming that a recent bill for a user 116 was higher than an average bill for the user 116, the user profile generator 102 may predict, based on the user profile which includes average bill amounts, that the user 116 has called to inquire about the higher bill. In this regard, the user 116 may be prompted (e.g., by the digital converter 118) with an inquiry as to whether they are calling about their most recent bill. Based on an affirmative response by the user 116, the user 116 may be prompted (e.g., by the digital assistant 120) with other inquiries related to billing to guide the user 116 towards resolution of any inquiries related to their most recent bill.

Referring to FIGS. 1 and 2, as disclosed herein, based on a determination that the purpose of the voice call 114 matches the determined intent 110, the digital converter 118 may ascertain a user assistance flow of the plurality of user assistance flows 108 that corresponds to the determined intent 110. Further, the digital converter 118 may cause the voice call to be transferred to the digital assistant 120, for example, to perform the user assistance flow that corresponds to the determined intent 110. In this regard, the digital converter 118 may effectively move the voice call 114 into a handset (e.g., the smartphone, computing device, etc., being utilized by the user 116). For example, if the user 116 chooses to bypass the user assistant 122, the digital converter 118 may move the voice call 114 into the digital assistant 120.

At the digital assistant 120, the capabilities of the device (e.g., smartphone, computer, etc.) being utilized by the user 116 may be utilized to provide the user information via voice, graphics, text, etc. The movement of the voice call 114 into the handset may provide the user 116 with a simulated experience similar to user interaction with the user assistant 122. Thus, the artificial intelligence with respect to the digital assistant 120 may operate as a user assistant 122 to answer any questions the user 116 may have, to perform a transaction as needed, etc.

Referring to FIGS. 1 and 2, the escalation analyzer 124 may ascertain, for the user assistance flow, an erroneous flow component of the user assistance flow. In this regard, the escalation analyzer 124 may generate, for the knowledge engineer 126, an inquiry to resolve an error with respect to the erroneous flow component of the user assistance flow. Over time, if there are any issues related to the voice call 114 that are not resolvable by the digital assistant 120, such a voice call 114 (or the issue related to the voice call 114) may be directed to an agent assisted chat 200 where a service agent (e.g., a user assistant 122) may assist the user 116. Alternatively or additionally, such a voice call 114 may be directed to a knowledge engineer 126 to assist the user 116, and/or to resolve an error related to a flow component of the user assistance flow. In this regard, the response generated by the knowledge engineer 126 may be utilized by a training tool 202 to train the digital assistant 120 for such issues related to a voice call in the future. The training tool 202 may be prompted by the escalation analyzer 124, which, for the example of FIG. 2, may be disposed between the digital assistant 120 and the training tool 202 when a voice call 114 is directed to a knowledge engineer 126.

Referring to FIGS. 1 and 2, at 204, in addition to offering a digital experience that mimics the live user assistant 122, the digital assistant 120 may utilize a communication channel that includes a chat function to explain an issue to the identified user 116 based on the user assistance flow that corresponds to the determined intent 110. For example, the digital assistant 120 may utilize a chat function to communicate with the user 116, for example, by providing text and/or graphical answers to the user 116.

Further, at 206, the digital assistant 120 may utilize a communication channel that includes a newly configured web portal (or an existing web portal) to provide information to the identified user 116 based on the user assistance flow that corresponds to the determined intent 110. For example, the digital assistant 120 may utilize a newly configured web portal that includes a newly configured direct network link to allow the user 116 to obtain assistance. Alternatively or additionally, the digital assistant 120 may utilize an existing web portal that includes an existing direct network link to allow the user 116 to obtain assistance.

Figure 3:
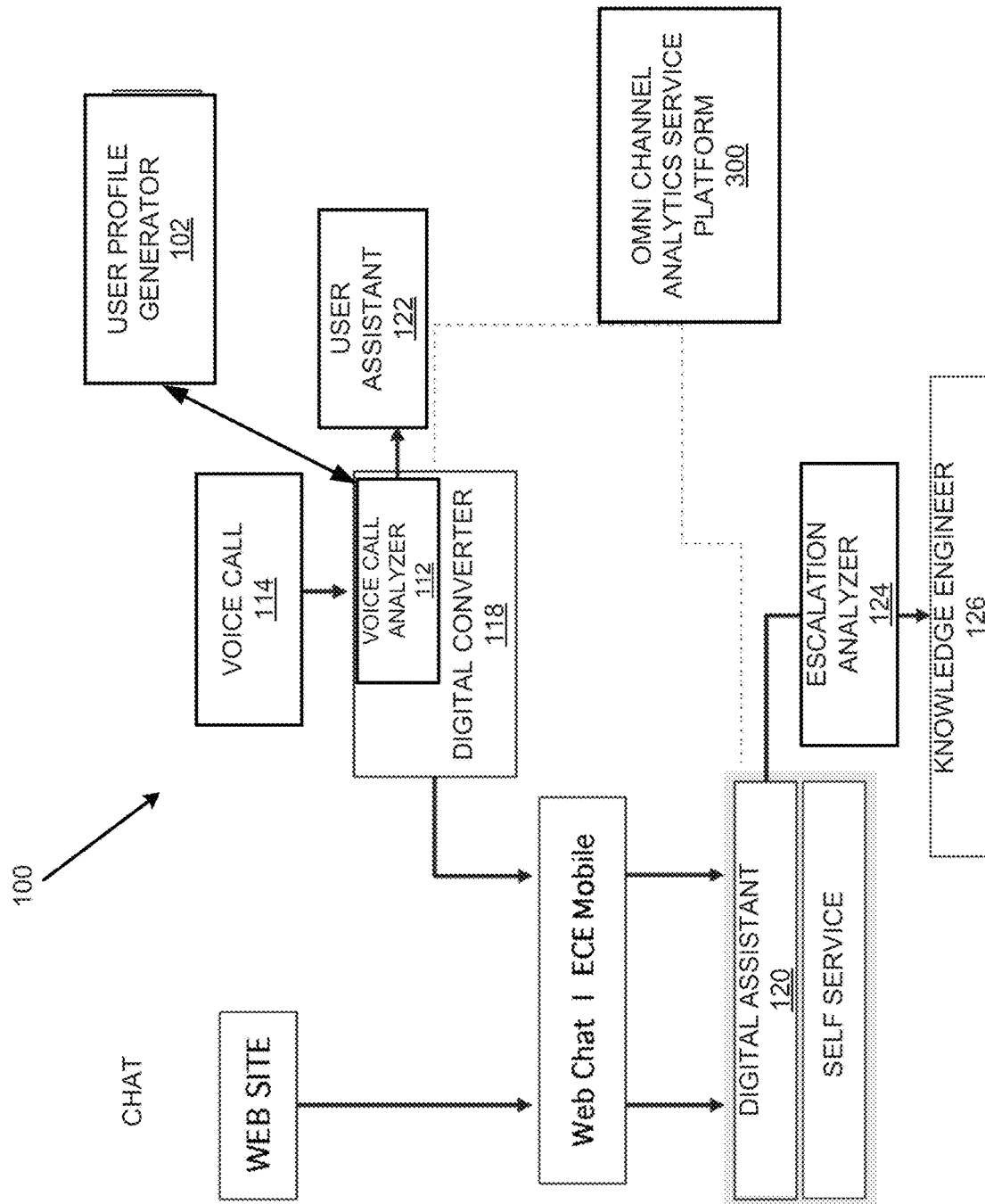
FIG. 3 illustrates further details of the architecture of the artificial intelligence based service implementation system of FIG. 1, according to an example of the present disclosure.

FIG. 3 illustrates further details of the architecture of the system 100, according to an example of the present disclosure.

Referring to FIGS. 1 and 3, as disclosed herein, the user profile generator 102 may ascertain a plurality of attributes 104 for a plurality of users 106. The user profile generator 102 may generate, based on an analysis of the plurality of attributes 104 (i.e., included in the user profile) for the plurality of users 106, scores for a plurality of user assistance flows 108 for each of the plurality of users 106. The user profile generator 102 may determine the intent 110 for each of the plurality of users 106 by identifying, for each of the plurality of users 106, a user assistance flow of the plurality of user assistance flows 108 that corresponds to a highest score of the plurality of generated scores. Thus, the user profile generator 102 may analyze attributes such as demographic, historical touchpoint, and real-time channel interaction data to identify patterns. The historical touchpoint attributes may include information with respect to any places where the user may have previously interacted in a specified (and recent) time period, where the places may be physical (e.g., a location, a building, etc.) or digital (e.g., a website, an application, etc.). The analysis of the attributes may be used to create intent prediction. Further, the predicted intent may be used to drive personalization with key insights specific at the line level. In this regard, for a user that may be part of a larger group (e.g., a family that includes several telephone lines), the predicted intent may be used to drive personalization with key insights specific at the line level of the user 116.

With respect to the digital converter 118, as disclosed herein, the digital converter 118 may generate, based on a determined intent 110 of the identified user 116, an inquiry to determine whether a purpose of the voice call 114 matches the determined intent 110. Based on a determination that the purpose of the voice call 114 matches the determined intent 110, the digital converter 118 may ascertain a user assistance flow of the plurality of user assistance flows 108 that corresponds to the determined intent 110. Further, the digital converter 118 may cause the voice call to be transferred to a digital assistant 120. In this regard, the digital converter 118 may determine the ideal user 116, the ideal action for the user 116, and personalize the voice call experience for the user 116. For example, the ideal user 116 may represent a user that meets a specified criterion. For example, there may be a cluster of users that may fit a profile (e.g., users that use land lines, as opposed to smartphones) for which the users are excluded. In this regard, the user may be outside of this cluster of users that represent non-ideal users. Alternatively, the user may be part of a cluster of users that use smartphones. In this regard, the user may represent an ideal user. According to another example, the digital converter 118 may determine the ideal action for the user 116 by determining the intent 110 for the user 116. Moreover, the digital converter 118 may personalize the voice call experience for the user 116 by identifying the user assistance flow of the plurality of user assistance flows 108 that corresponds to the determined intent 110. Further, the digital converter 118 may utilize digital propensity models, chat success and fallout to refine who the optimal user is. With respect to digital propensity models, these models may be used to determine if the user 116 is digitally enabled. For example, the user 116 may include a login and may have connected to a service within the past six months, whereas a relative of the user may not have a login. Thus the user 116 may be more likely to be a digitally enabled user. Chat success may represent a determination that the user 116 has successfully engaged in chat sessions. Further, fallout may represent a determination that the user 116 has presented issues that have not been resolved. The digital converter 118 may thus represent a rule based engine that is built to flex based on usage/adoption of advanced customer engagement. In this regard, a user's degree of usage of the system 100 may directly correlate to the types of services that are offered to the user 116.

With respect to the escalation analyzer 124, as disclosed herein, the escalation analyzer 124 may ascertain, for the user assistance flow, an erroneous flow component of the user assistance flow. In this regard, the escalation analyzer 124 may generate, for a knowledge engineer 126, an inquiry to resolve an error with respect to the erroneous flow component of the user assistance flow. The escalation analyzer 124 may ascertain, from the knowledge engineer 126, a response to the inquiry to resolve the error with respect to the erroneous flow component of the user assistance flow. Further, the escalation analyzer 124 may modify, based on the response to the inquiry to resolve the error, the user assistance flow. Thus, the escalation analyzer 124 may utilize a knowledge engineer 126 to identify gaps to improve automation and user satisfaction. The escalation analyzer 124 may enhance the artificial intelligence code utilized by the digital assistant 120, and update the artificial intelligence based on fallout patterns. For example, the escalation analyzer 124 may determine when a user is transferred to a knowledge engineer, and thus offer recommendations to improve the digital assistant 120 to modify artificial intelligence on how to assist the user 116. For example, assuming that the user 116 requests a teal colored smartphone, if teal smartphones are not available, no smartphones may be offered. In this regard, the artificial intelligence may be modified to determine that when a user requests teal smartphones, the user may be offered comparable blue smartphones, where teal may be determined to be a synonym for blue.

Referring to FIG. 3, the OMNI channel analytics service platform 300 may integrate all user interactions across different channels (e.g., physical, digital, human, etc.). For example, all channels related to retail, website, call center, mobile application, etc., may be connected, and integrated in single platform for analytics.

Figure 4:
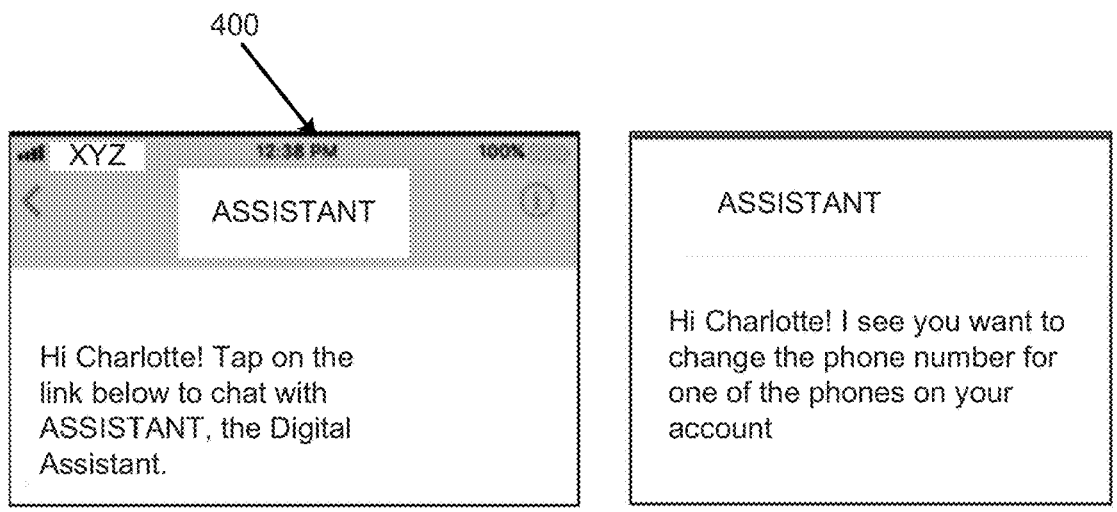
FIG. 4 illustrates an example of operation of the artificial intelligence based service implementation system of FIG. 1, according to an example of the present disclosure.
Figure 4:
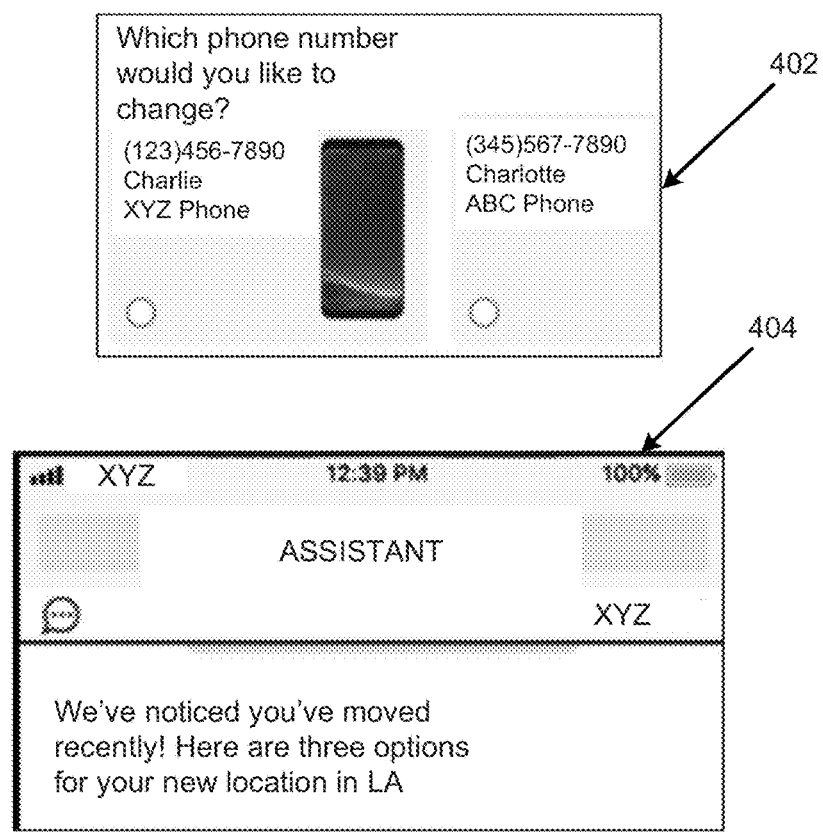

FIG. 4 illustrates an example of operation of the system 100, according to an example of the present disclosure.

Referring to FIGS. 1 and 4, at 400, assuming that the name of the user 116 is known, or the voice call analyzer 112 determines the name of the user 116, the digital converter 118 may greet the user 116 by their name. In this regard, the digital converter 118 may guide the user 116 to select their intent. For example, the digital converter 118 may inquire "are you calling to change your mobile telephone network?". This inquiry may be based on a high confidence on the intent prediction. For example, if relatively little information is known on the user 116, the amount of known information may be used to determine a confidence on the intent prediction. For example, if only x % of attributes for the user 116 include known answers, the confidence on the intent prediction may directly correspond to the x % of known answer attributes. Alternatively, the confidence on the intent prediction may also include negative and positive weights assigned to incorrect or correct answers with respect to attributes. If the user 116 indicates that they are not calling to change their mobile telephone network, or if the confidence on the intent prediction is low (e.g., below a specified confidence threshold of 70%), the digital converter 118 may inquire "to assist you, please say the reason for your call today . . . <pause> for example, you can say 'change my number'".

Once the voice call 114 is transferred to the digital assistant 120 as disclosed herein, the digital assistant 120 may simplify the interaction with the user 116 with behavior and account information. For example, the digital assistant 120 may generate a display of a number of lines on an account as shown at 402. Further, at 404, the digital assistant 120 may generate a display of a recent billing address change.

The digital assistant 120 may also account for future personalization considerations such as user anniversaries with a service provider, rewards status, etc. In this regard, the future personalization considerations may be used to personalize the interaction between the digital assistant 120 and the user 116.

Figure 5:
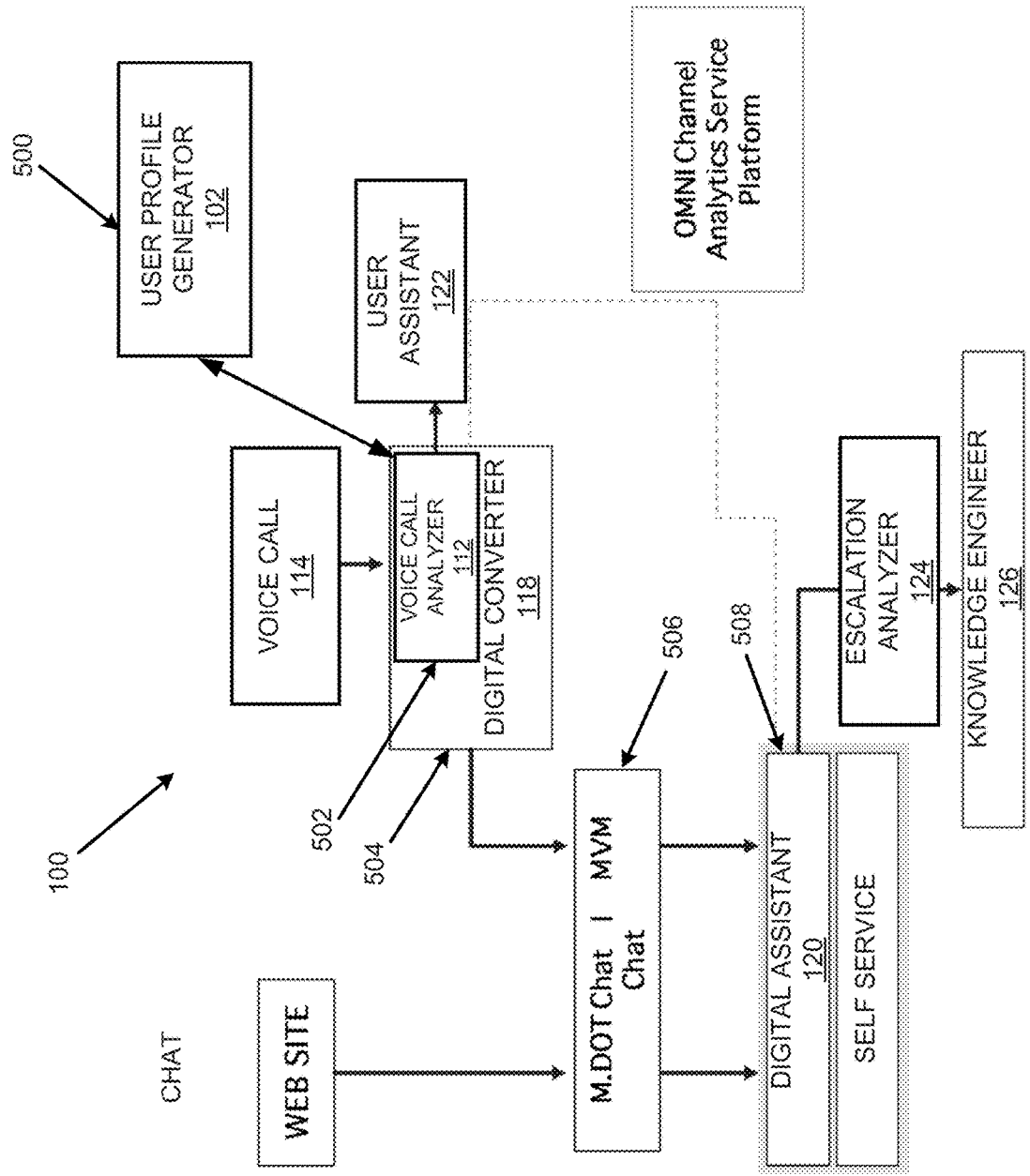
FIG. 5 illustrates further details of the architecture of the artificial intelligence based service implementation system of FIG. 1, according to an example of the present disclosure.

FIG. 5 illustrates further details of the architecture of the system 100, according to an example of the present disclosure.

Referring to FIGS. 3 and 5, FIG. 5 includes a similar layout as FIG. 3, except that FIG. 5 includes further details with respect to personalization of the interaction of the digital assistant 120 with the user 116. In this regard, at 500, the user profile generator 102 may generate analytic models with respect to the plurality of users 106. The analytic models may be generated by ascertaining the attributes 104, cleansing the attributes 104 to remove, for example, anomalies, transforming the data related to the attributed 104 into working data, and applying intelligence using predictive analytic models. In this regard, decision trees, logistic regression, clustering, and dynamic simulation may be performed as well to generate the analytic models. Further, the user profile generator 102 may perform ongoing scoring with respect to the analytic models.

At 502, the voice call analyzer 112 may predict user intent with confidence. For example, the voice call analyzer 112 may determine a confidence value with respect to prediction of the user intent as a function of the number of attributes, from a total number of attributes, that include information for the user 116.

At 504, the digital converter 118 may determine eligibility, for example, as to whether a user is digitally eligible to receive service with respect to the digital assistant 120. Further, the digital converter 118 may offer services of the digital assistant 120 for intent, for example, based on the user's eligibility and propensity to take accept a service.

At 506, the mobile web browser chat and mobile application may personalize the short message service (SMS) text message with respect to the user 116.

At 508, the digital assistant 120 may personalize the content of the chat with the user 116. For example, the digital assistant 120 may use known demographic information (e.g., name) as well as situational data (e.g., user history) to make the experience more personalized. For example, aspects such as a recent generation of a bill, whether a user was recently in a store or online, may be ascertained to make the experience more personalized.

Referring again to FIG. 1, the analytics framework of the system 100 is described in further detail.

With respect to the analytics framework, the analytics areas may focus on improving user experience for intents. In this regard, the analytics framework may include artificial intelligence design analyses, personalization analytics, digital converter analytics, operations analytics, conformed data models, and an application programming interface (API) layer. The artificial intelligence design analyses may represent areas of potential fallout in existing channel interactions. An example of a potential fallout may include when a user is trying to pay a bill and the payment was not processed properly (either through the fault of the user or the existing technology). The personalization analytics may represent customer behaviors and interactions that may be used as inputs for personalization in the voice call analyzer 112 and the digital assistant 120. The digital converter analytics may represent likelihood of users to opt into and succeed with the digital assistant 120, and factors to determine whether the digital assistant 120 should be offered. In this regard, if a user has a relatively large digital footprint, or uses a digital channel with high frequency, the user may be considered to be a user that is likely to be offered the services with respect to the digital assistant 120. The operations analytics may represent measurement of outcome of artificial intelligence interaction and areas of improvement. The conformed data models may represent OMNI interaction analytic records and patterns from a conversation analytic record. In this regard, the conformed data models may model a user's journeys, such as retail visits for troubleshooting or online visits for purchase. The collection of all user experiences may enable insights to be developed to increase user satisfaction. The application programming interface (API) layer may include interfaces with systems to feed analytics outputs.

With respect to the analytics framework and the analytics areas that may include artificial intelligence design analyses, personalization analytics, digital converter analytics, operations analytics, and conformed data models, these areas may correspond to the voice call analyzer 112, the digital converter 118 decision making, artificial intelligence chat, and the knowledge engineer 126 as follows.

Specifically, the artificial intelligence design analyses may correspond to the artificial intelligence chat to improve a conversation design by analyzing current fallout behavior.

The personalization analytics may correspond to the voice call analyzer 112 for finding key segments that call into care about pilot intents and using insights to personalize the voice call analyzer 112 touchpoint. In this regard, based on information that is knows about a user's journey, information about the user may be personalized, or information about where the user is in their journey may be personalized. For example, if the user recently tried to activate a smartphone online and failed at Step #2, the experience for this user may be personalized to troubleshoot Step #2 specifically. For the personalization analytics, the digital converter 118 decision may include learnings from personalization analytics that may influence whether the digital assistant 120 is offered. For the personalization analytics, with respect to artificial intelligence chat, knowledge of actions leading to an intent call may be used in a personalized digital assistant greeting. With respect to the intent call, the intent call may represent the reason or the cause of the user's inquiry. For example, the "intent" by which the user is calling may be to discuss their bill. Further, for the personalization analytics, a knowledge engineer may ascertain personalization findings about the user 116 during a chat for additional background on user behavior.

With respect to digital converter 118 analytics, the digital converter decision may decide whether the user 116 should be offered the digital assistant 120 by a combination of digital propensity, evaluation of success in digital channels, and other rules. In this regard, the digital converter 118 may examine the user's digital propensity (e.g., how likely they are to be digital, do they have a digital account, have they recently used the digital assistant 120, have they never used the digital assistant 120), as well as information that is known about the user (e.g., do they have a smart phone, are they currently using the smart phone), as well as whether the user's intent/reason for calling is programmed into the digital assistant 120 in order to determine whether to use the digital assistant 120.

The operations analyses may correspond to the voice call analyzer 112 for monitoring effectiveness of personalization analytics, and refining the personalization analytics. For the operations analyses, the digital converter 118 decision may include monitoring of the effectiveness of digital converter analytics, and refining the digital converter analytics. For the operations analyses, with respect to artificial intelligence chat, key performance indicators may be used to assess artificial intelligence performance. With respect to the key performance indicators, key performance indicators such as % automation, % users who took the offer of the digital assistant 120 over the phone call, % of users who successfully authenticated with the digital assistant 120, etc., may be used to assess artificial intelligence performance. Further, for the operations analyses, a knowledge engineer may identify where fallout is occurring in artificial intelligence, possible root causes, and utilize operational reporting to improve the artificial intelligence chat experience.

The conformed data models may correspond to the voice call analyzer 112 for using interaction behavior and conversation patterns to personalize voice call analyzer 112 experience. For the conformed data models, the digital converter 118 decision may utilize customer conversation attributes to indicate whether to offer the digital assistant 120. In this regard, conversation attributes such as what a user may have said into the voice call analyzer 112 as their reason for the call, and whether similar conversations with the digital assistant 120 have been successful may all be attributable to determine whether to offer the digital assistant 120. For the conformed data models, with respect to artificial intelligence chat, interaction and conversation patterns may lead to personalized chats in artificial intelligence. Further, for the conformed data models, a knowledge engineer may use conformed data models to examine fallout from artificial intelligence.

With respect to artificial intelligence design for the digital assistant 120, prior to launching of the system 100, an examination may be made as to where in traversal fallout is occurring for pilot intents by channel, and why fallout is occurring in identified areas. In this regard, the population of the users 106 may be segmented to determine who is falling out of self-service channels. In this regard, support may be provided for additional analyses prior to launching of the system 100 to improve bot conversations. The outcome of the examination and segmentation as disclosed above may provide for past journey examination to determine root causes of current channel fallout for pilot intents, uncovering of behavioral patterns and identification of pain points experienced by the user 116 during interaction to inform user experience and design of artificial intelligence conversation, and classification and clustering to hone in on segments. With respect to classification and clustering, segments of users such as digitally savvy users, or users who are relatively busy and don't want to have a long conversation, may be examples of segments that would be likely candidates for the digital assistant 120. A cluster such as children under a certain age may be a segment that may be excluded for the digital assistant 120.

With respect to artificial intelligence design analyses inputs, an examination may be made of where in the journey fallout occurs, which may have similar factors as the fallout propensity model. In this regard, if there is a relatively large amount of fallout in a particular area or the user is "failing" at a certain point in the digital assistant 120, that conversation/discussion element may be excluded in the future.

With respect to personalization analytics as disclosed herein, this may include honing in on components of user and intent segments that are driving up live channel interactions. Strong drivers for certain intent and user segments may be used for personalization in the voice call analyzer 112. With respect to the strong drivers, the strong drivers may represent call types that may be analyzed, or intents that may be analyzed that drive a disproportionately large volume of calls, and these may represent the types of interactions that may be built and simulated through the digital assistant 120. Outcomes with respect to the aforementioned aspects for personalization analytics may include prediction of drivers for calls into care, micro-segment personalization in the voice call analyzer 112, personalization for the digital assistant 120, and findings that may influence knowledge engineers and offering of solution.

With respect to personalization analytics, inputs related to attributes that are used to determine intent for the plurality of users 106 may include line level intelligence, profile attributes, event history, and segmentation. In this regard, as disclosed herein for the example of the plurality of user assistance flows that include an "upgrade eligibility inquiry" user assistance flow, a "change mobile telephone network" user assistance flow, a "device payment" user assistance flow, a "routing" user assistance flow, a "tailored experience" user assistance flow, each of these user assistance flows may include different associated attributes.

For example, the "upgrade eligibility inquiry" user assistance flow may include the attributes of frequency of upgrade, tenure, account upgrade recency, social influence, upgraded device, preferred channel of upgrade, brand loyalty, new device release, contract end dates/remaining payments/balance, type of contract (two year plan/subsidy, device payment plan, etc.), browsing devices through digital channels, frequency of channel interactions, likelihood of upgrade, troubleshooting related touchpoints, etc.

With respect to the "change mobile telephone network" user assistance flow, the associated attributes may include change in geography, desirable area codes, previous calls about mobile telephone network change, proximity to store, previously changed mobile telephone network, harassment reports, blocked calls/messages, block # requests, age, etc.

With respect to the "device payment" user assistance flow, the associated attributes may include overlap with upgrade eligibility, multi-line accounts, churn propensity, likelihood of upgrade, etc.

With respect to the "routing" user assistance flow, the associated attributes may include churn propensity, upsell/cross-sell likelihood of certain products in channels, etc.

With respect to the "tailored experience" user assistance flow, the associated attributes may include digital savviness, college education, city versus suburban, single/married, kids/no kids, interaction length by channels, rate of transaction versus informational touchpoints, etc.

Accordingly, with respect to determination of intent, for different user experiences, attributes related to different demographics, and situational data may be analyzed. This data may then be analyzed to determine whether the data exists in a user profile, how much of a role the data plays in significance, and these aspects may be used to determine a score. For example, with respect to the "upgrade eligibility inquiry" user assistance flow, for all the different attributes that include, for example, frequency of upgrade, tenure of user, social influence, upgrade device (what type of device the user has), etc., these attributes may be used to generate a score. For example, a score may be generated for each user assistance flow of a plurality of user assistance flows. For example, for the "upgrade eligibility inquiry" user assistance flow, the score may indicate that there is a 95% probability that the user is calling today about upgrade eligibility. Alternatively, for the "change mobile telephone network" user assistance flow, the score may indicate that there is a 70% probability that the user is calling today about changing mobile telephone network. In this regard, different attributes may be analyzed to determine which of the user assistance flows is most likely to correspond to an intent of the user 116. Thus, based on the 95% score for the upgrade eligibility inquiry user assistance flow, the user may be offered assistance with respect to upgrade eligibility. That is, the digital converter 118 may direct the call 114 to the digital assistant 120 to offer the user 116 assistance with respect to upgrade eligibility.

With respect to scoring, each attribute for a user assistance flow may be assigned a score. For example, for the upgrade eligibility inquiry user assistance flow, each attribute such as frequency of upgrade, tenure, account upgrade recency, etc., may be assigned a score. For example, for the frequency of upgrade, a score between 0-100 may be assigned on how often the user 116 upgrades within a specified time duration (e.g., 2 years). Similarly, for tenure, a score between 0-100 may be assigned on how long the user 116 has been with a particular company associated with the product that is subject to the inquiry. In this manner, scores related to all of the attributes for each user assistance flow may be determined and then averaged to generate a final score for the user assistance flow.

With respect to the digital converter 118, analytics with respect to the digital converter 118 may be based on analysis of digital-savviness of the user 116 to be receptive to chatting with a bot, application of existing channel propensity models for the digital assistant 120, tapping into existing bot pilot results to find user and intent segments likely to be contained in artificial intelligence, and rules layering such as long term value of user, churn, likelihood of sale, repeat caller. All of these factors may be included in the data models, and for example, if there is a chance of churn, the digital assistant 120 may not be offered, and instead, the call may be sent to the user assistant 122. However, for a repeat caller who has had a good experience before with the digital assistant 120, that user may be prioritized into the digital assistant experience. Further, the outcome of these aspects may include algorithms to determine channel propensity for artificial intelligence tool, prediction on likelihood of contain success within artificial intelligence, customer behavior segments with low fallout risk, and digital conversion playbook (e.g., targeted rules engine combined with analytics to determine when to offer the digital assistant 120).

With respect to digital converter analytics, inputs for the digital converter 118 may include line level intelligence, profile attributes, event history, and segmentation. In this regard, for propensity to opt into the digital assistant 120, inputs may include channel preference—frequency and recency, complexity of digital interaction, age, education level, occupation, geography: rural versus urban, technology hubs, e-commerce usage, data usage, device purchased (newer versus older release), tablet, prior chat usage (y/n), attempting to transfer out of voice call analyzer without trying voice call analyzer (selecting 0-agent), telco application downloaded (y/n), etc. For propensity to have a successful digital assistant interaction, inputs may include complexity of previous interactions, channel interaction duration, long hold times, used chat before successfully (y/n), if transaction in chat, no follow up call about same intent, no repeat touchpoints, etc. Further, for rules to determine whether the digital assistant 120 should be offered, inputs may include repeat callers/unsuccessful digital assistant interactions, churn, LTV, recent promise to pay interaction, bill balance overdue, rural, low coverage areas, age, low data usage, number of applications installed, etc.

With respect to the escalation analyzer 124, operations analyses may include approaches such as whether the user 116 opted in for pilot intent? was user successful?<-operational dashboards of KPIs and monitoring of design, digital converter 118 and personalization analyses, analysis of fallout within the digital assistant interaction, ascribing of reasons for fallout in artificial intelligence that may feed into improved conversation design, and future intents to target, and determination of timing of operational reporting as per use case(s): real time, weekly dashboard, etc. The outcome of these approaches may include, for example, setting up data connections and reusable reporting for knowledge engineers to consume, assessment of digital converter 118 and personalization analytics, and insights on where fallouts are occurring as inputs for re-training the artificial intelligence engine.

With respect to confirmed data models for the escalation analyzer 124, approaches may include interactions that include exploration of touchpoint data for viability in fallout analyses, and adding of channels/transform elements as needed. Further, the approaches may include conversations that include design and gather requirements across data science, and operations teams, and exploration of natural language processing techniques to parse conversations to find patterns and attributes. Further, outcomes for these approaches may include stitching together of history of user cross-channel interactions and conversations, input into digital converter user offering, and assistance with respect to analysis of fallout behavior from artificial intelligence tool.

With respect to the application programming input layer for the escalation analyzer 124, approaches may include identification of opportunities where models and findings may be leveraged across OMNI-channel space. Further, outcomes for these approaches may include design and development of connections with information technology systems, and sending of modeling outputs and insights to other channels, such as for use in retail.

The attributes that may be used to determine intent by the user profile generator 102 may include, for example, n_ivr that represents a number of voice call analyzer interactions that do not go to the user assistant 122, n_store that represents a number of store interactions (direct and indirect), n_chat that represents a number of chat interactions, channel prior post base that represents a channel of interaction immediately prior to base interaction, n_alltps_prior that represents total touchpoint across all channels prior to interaction, n_mvm_I_prior that represents a number of legacy mobile app interactions, n_human_prior that represents total human interactions prior to base, n_caregen_prior that represents general customer service interactions, n_carets_prior that represents tech services interactions (calls), n_telesales_prior that represents telesales interactions (calls), n_retail_prior that represents direct retail interactions prior, cluster final that represents demographic cluster, line_tenure_dtl that represents how long a user line has been active, bill_presentment that represents how a user receives their bill, segmt_desc that represents an age group, handset_tier that represents a type of mobile device, MVM driver that represents mobile app session: account maintenance, international, shop, and upgrade, keyword search driver that represents a search word on web: account maintenance and upgrade, call driver that represents previous calls: account maintenance and upgrade, and web driver that represents web session: account maintenance, homepage only, shop, and upgrade.

For the attributes listed above, all "n_" variables may count interactions, for example, in the three days prior to the voice call 114.

The models utilized by the system 100 may include, for example, a step-wise function to facilitate variable selection, K-Means clustering to cluster by intent to identify attributes that correlate more strongly with one intent over another, and decision tree for variable selection and identifying an optimal model.

Figure 6:
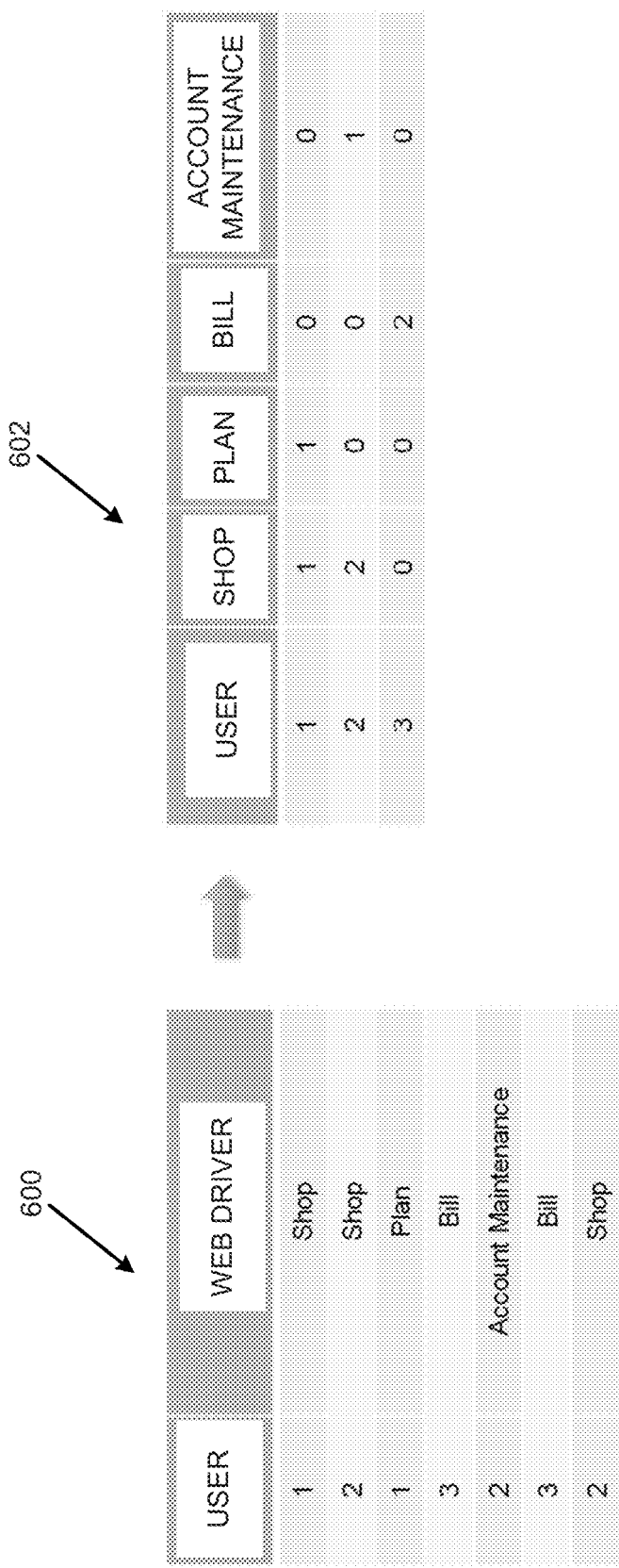
FIG. 6 illustrates an example of attribute pivoting to illustrate operation of the artificial intelligence based service implementation system of FIG. 1, according to an example of the present disclosure.

FIG. 6 illustrates an example of attribute pivoting to illustrate operation of the system 100, according to an example of the present disclosure.

Referring to FIG. 6, with respect to attribute pivoting to transform categorical input data attributes into individual counts for analysis, at 600, a user number and associated web driver are listed. At 602, the different web drivers and their associated counts are listed. For the table at 602, User-1 may be determined to have both shop and plan related characteristics, and thus other information about the user (e.g., plan information, recent visits, etc.) may be considered to help determine the intent of the call. User-2 may be weighted heavier towards shop than account maintenance, and the digital converter 118 may determine an intent of the User-2 as being related to shop and offer an associated user flow.

FIG. 7 illustrates an example of multinomial logistic regression results to illustrate operation of the system 100, according to an example of the present disclosure.

Referring to FIG. 7, the regression analysis may be used to predict the reason for calling against other reasons for calling to determine if there are multiple reasons perhaps for the call and when an offer is made, whether multiple offers should be made. That is, the regression analysis may show whether it is a single reason or if there are multiple reasons perhaps on the model (and the accuracy of making an offer for multiple reasons). Referring to FIG. 7, the numbers such as 5673 for add change plan, 733 for bill explanation and add plan change, 7625 for bill explanation, etc., may represent a number of matches in users with experiences in the analysis.

Figure 8:
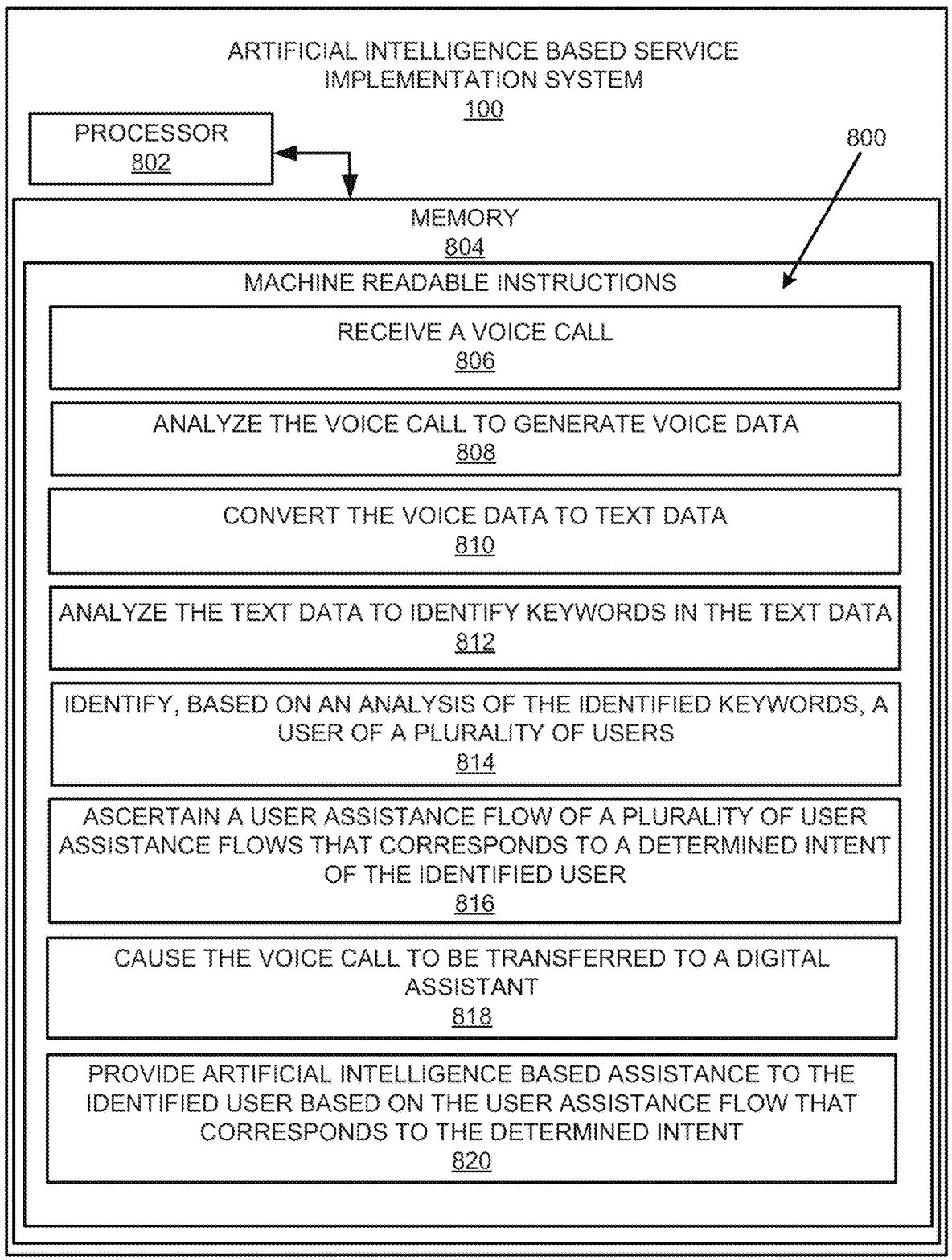
FIG. 8 illustrates a block diagram for artificial intelligence based service implementation, according to an example of the present disclosure.
Figure 9:
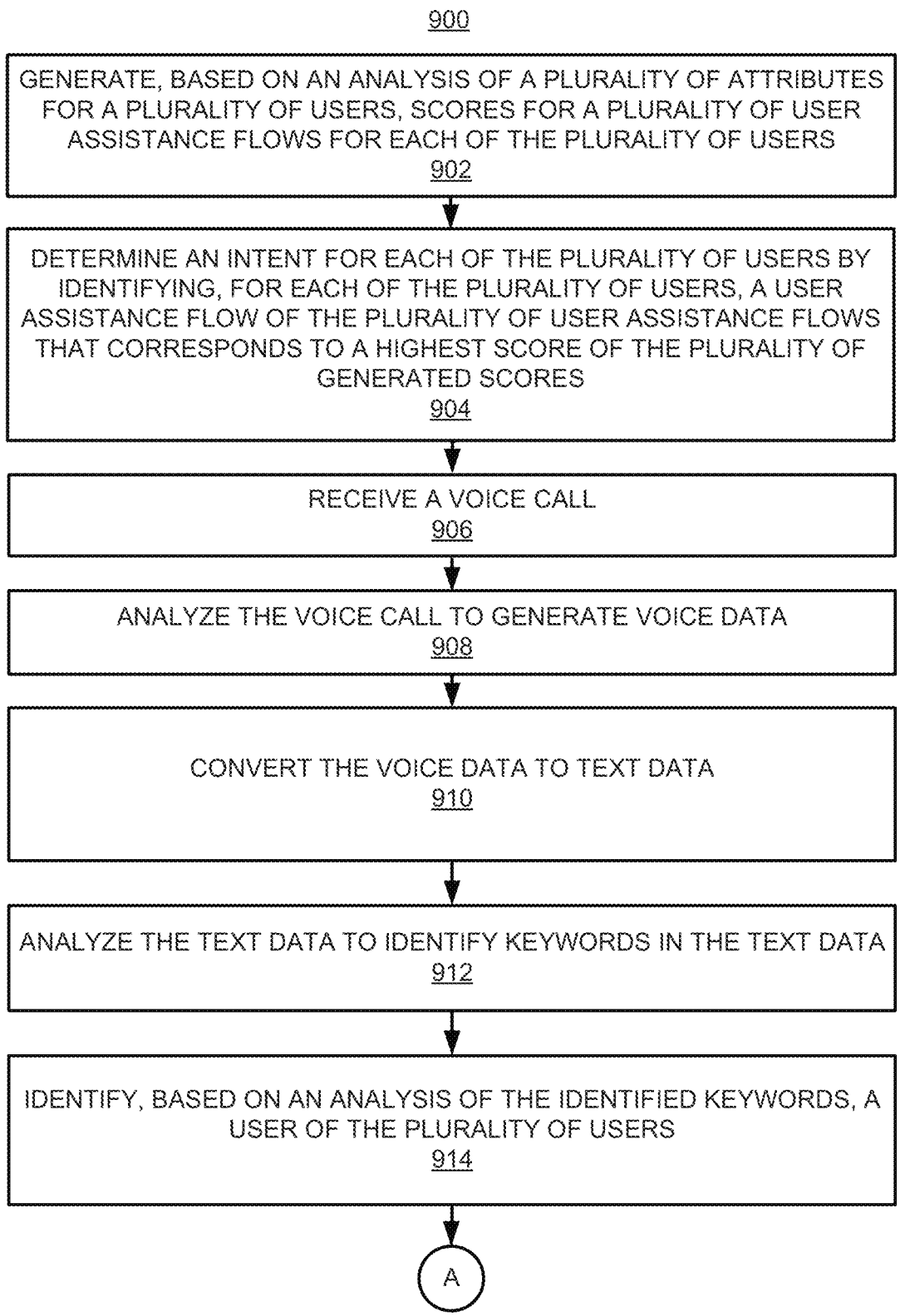
FIG. 9 illustrates a flowchart of a method for artificial intelligence based service implementation, according to an example of the present disclosure.
Figure 9:
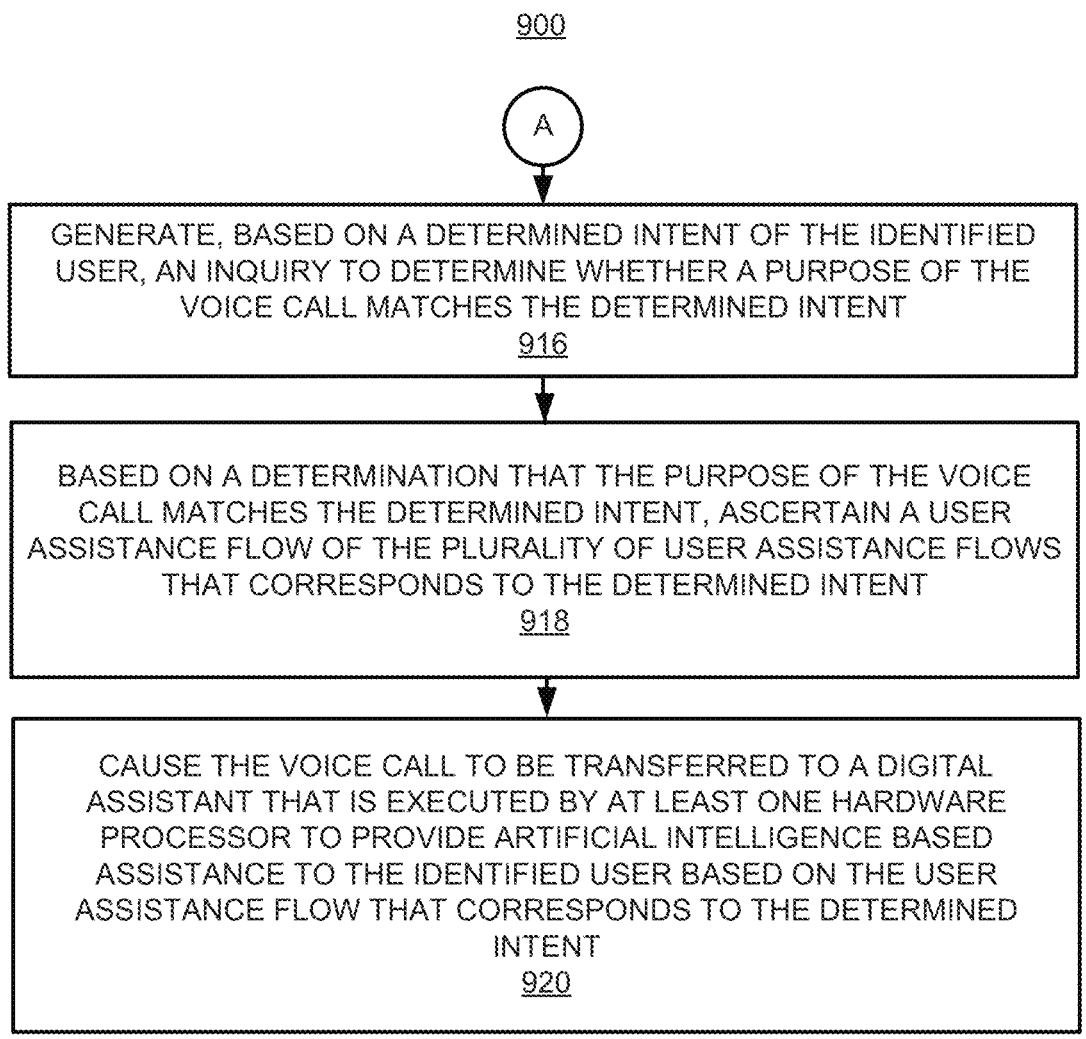
Figure 10:
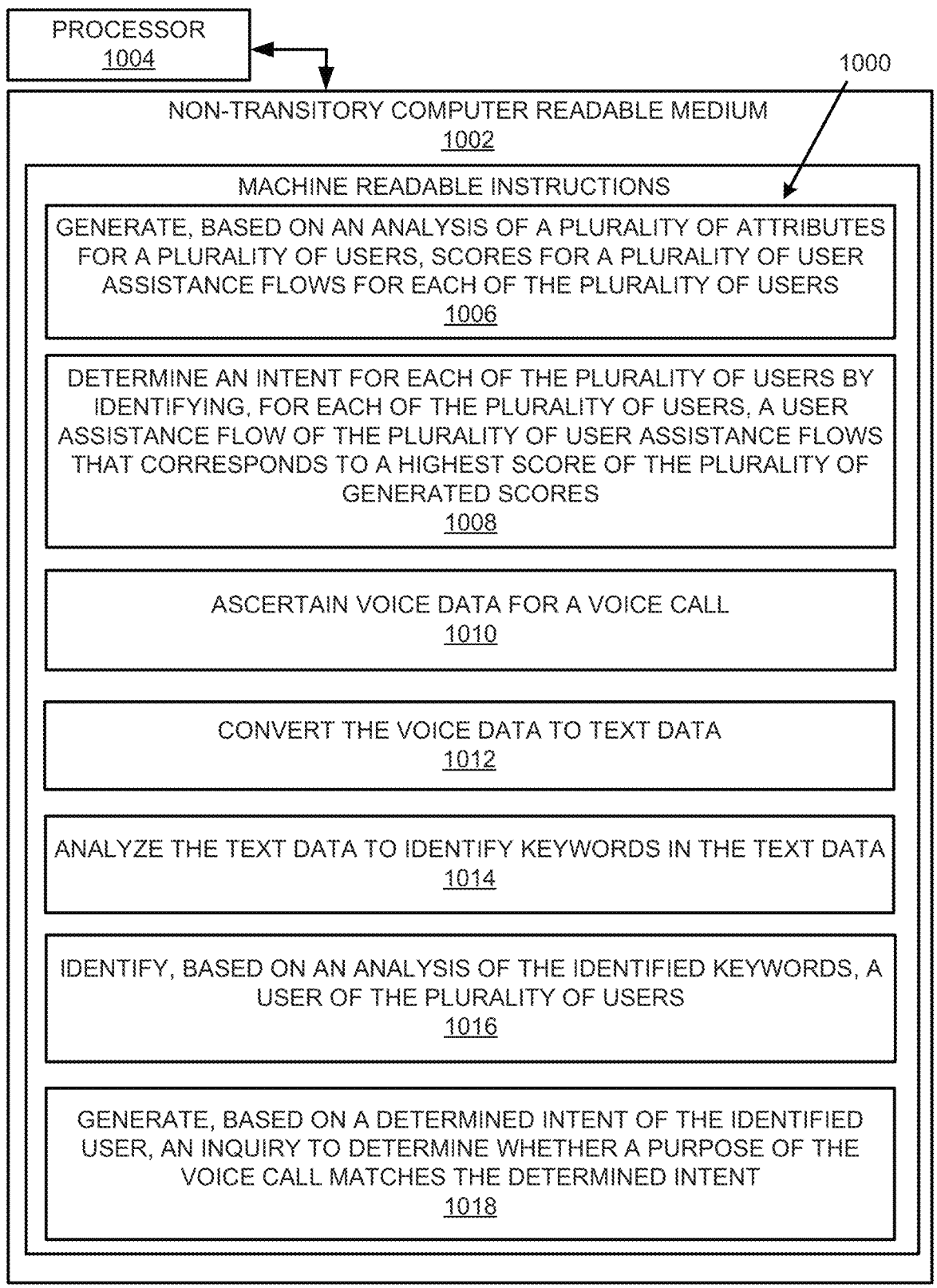
FIG. 10 illustrates a further block diagram for artificial intelligence based service implementation, according to an example of the present disclosure.
Figure 10:
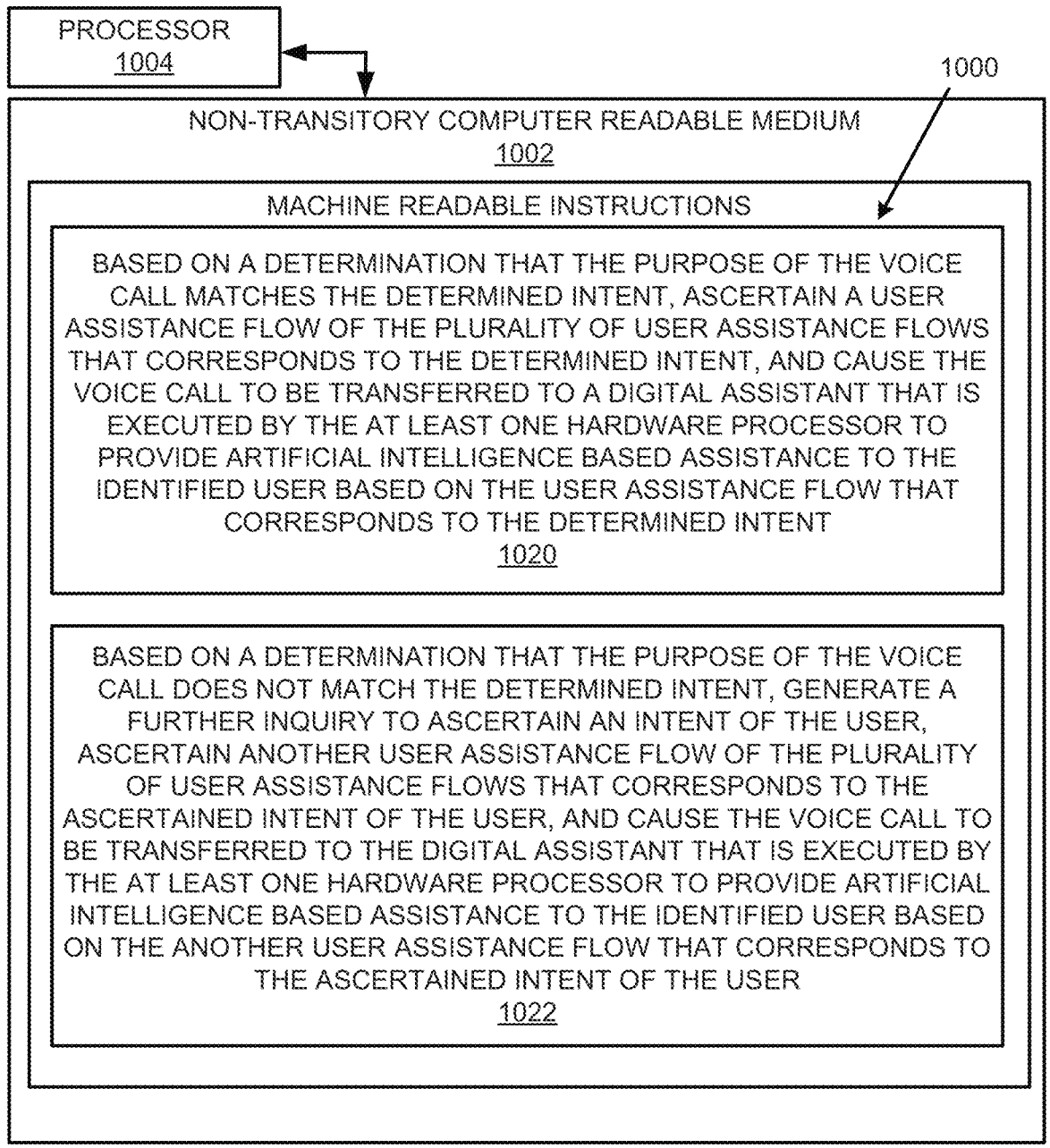

FIGS. 8-10 respectively illustrate a block diagram 800, a flowchart of a method 900, and a further block diagram 1000 for artificial intelligence based service implementation, according to examples. The block diagram 800, the method 900, and the block diagram 1000 may be implemented on the system 100 described above with reference to FIG. 1 by way of example and not limitation. The block diagram 800, the method 900, and the block diagram 1000 may be practiced in other systems. In addition to showing the block diagram 800, FIG. 8 shows hardware of the system 100 that may execute the instructions of the block diagram 800. The hardware may include a processor 802, and a memory 804 storing machine readable instructions that when executed by the processor cause the processor to perform the instructions of the block diagram 800. The memory 804 may represent a non-transitory computer readable medium. FIG. 9 may represent a method for artificial intelligence based service implementation, and the steps of the method. FIG. 10 may represent a non-transitory computer readable medium 1002 having stored thereon machine readable instructions to provide artificial intelligence based service implementation. The machine readable instructions, when executed, cause a processor 1004 to perform the instructions of the block diagram 1000 also shown in FIG. 10.

The processor 802 of FIG. 8 and/or the processor 1004 of FIG. 10 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1002 of FIG. 10), such as hardware storage devices (e.g., RAM (random access memory), ROM (read only memory), EPROM (erasable, programmable ROM), EEPROM (electrically erasable, programmable ROM), hard drives, and flash memory). The memory 804 may include a RAM, where the machine readable instructions and data for a processor may reside during runtime.

Referring to FIGS. 1-8, and particularly to the block diagram 800 shown in FIG. 8, the memory 804 may include instructions 806 to receive a voice call 114.

The processor 802 may fetch, decode, and execute the instructions 808 to analyze the voice call 114 to generate voice data.

The processor 802 may fetch, decode, and execute the instructions 810 to convert the voice data to text data.

The processor 802 may fetch, decode, and execute the instructions 812 to analyze the text data to identify keywords in the text data.

The processor 802 may fetch, decode, and execute the instructions 814 to identify, based on an analysis of the identified keywords, a user 116 of a plurality of users 106.

The processor 802 may fetch, decode, and execute the instructions 816 to ascertain a user assistance flow of a plurality of user assistance flows 108 that corresponds to a determined intent 110 of the identified user 116.

The processor 802 may fetch, decode, and execute the instructions 818 to cause the voice call 114 to be transferred to a digital assistant 120.

The processor 802 may fetch, decode, and execute the instructions 820 to provide artificial intelligence based assistance to the identified user 116 based on the user assistance flow that corresponds to the determined intent 110.

Referring to FIGS. 1-7 and 9, and particularly FIG. 9, for the method 900, at block 902, the method may include generating, based on an analysis of a plurality of attributes 104 for a plurality of users 106, scores for a plurality of user assistance flows 108 for each of the plurality of users 106.

At block 904, the method may include determining an intent 110 for each of the plurality of users 106 by identifying, for each of the plurality of users 106, a user assistance flow of the plurality of user assistance flows 108 that corresponds to a highest score of the plurality of generated scores.

At block 906, the method may include receiving a voice call 114.

At block 908, the method may include analyzing the voice call 114 to generate voice data.

At block 910, the method may include converting the voice data to text data.

At block 912, the method may include analyzing the text data to identify keywords in the text data.

At block 914, the method may include identifying, based on an analysis of the identified keywords, a user 116 of the plurality of users 106.

At block 916, the method may include generating, based on a determined intent 110 of the identified user 116, an inquiry to determine whether a purpose of the voice call 114 matches the determined intent 110.

Based on a determination that the purpose of the voice call 114 matches the determined intent 110, at block 918, the method may include ascertaining a user assistance flow of the plurality of user assistance flows 108 that corresponds to the determined intent 110.

At block 920, the method may include causing the voice call 114 to be transferred to a digital assistant 120 that is executed by at least one hardware processor to provide artificial intelligence based assistance to the identified user based on the user assistance flow that corresponds to the determined intent 110.

Referring to FIGS. 1-7 and 10, and particularly FIG. 10, for the block diagram 1000, the non-transitory computer readable medium 1002 may include instructions 1006 to generate, based on an analysis of a plurality of attributes 104 for a plurality of users 106, scores for a plurality of user assistance flows 108 for each of the plurality of users 106.

The processor 1004 may fetch, decode, and execute the instructions 1008 to determine an intent 110 for each of the plurality of users 106 by identifying, for each of the plurality of users 106, a user assistance flow of the plurality of user assistance flows 108 that corresponds to a highest score of the plurality of generated scores.

The processor 1004 may fetch, decode, and execute the instructions 1010 to ascertain voice data for a voice call 114.

The processor 1004 may fetch, decode, and execute the instructions 1012 to convert the voice data to text data.

The processor 1004 may fetch, decode, and execute the instructions 1014 to analyze the text data to identify keywords in the text data.

The processor 1004 may fetch, decode, and execute the instructions 1016 to identify, based on an analysis of the identified keywords, a user 116 of the plurality of users 106.

The processor 1004 may fetch, decode, and execute the instructions 1018 to generate, based on a determined intent 110 of the identified user, an inquiry to determine whether a purpose of the voice call 114 matches the determined intent 110.

Based on a determination that the purpose of the voice call 114 matches the determined intent 110, the processor 1004 may fetch, decode, and execute the instructions 1020 to ascertain a user assistance flow of the plurality of user assistance flows 108 that corresponds to the determined intent 110, and cause the voice call 114 to be transferred to a digital assistant 120 that is executed by the at least one hardware processor to provide artificial intelligence based assistance to the identified user 116 based on the user assistance flow that corresponds to the determined intent 110.

Based on a determination that the purpose of the voice call 114 does not match the determined intent 110, the processor 1004 may fetch, decode, and execute the instructions 1022 to generate a further inquiry to ascertain an intent of the user 116, ascertain another user assistance flow of the plurality of user assistance flows 108 that corresponds to the ascertained intent of the user 116, and cause the voice call 114 to be transferred to the digital assistant 120 that is executed by the at least one hardware processor to provide artificial intelligence based assistance to the identified user 116 based on the another user assistance flow that corresponds to the ascertained intent of the user 116.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A system comprising:
   a voice call analyzer, executed by at least one hardware processor, to
      receive a voice call,
      analyze the voice call to generate voice data,
      convert the voice data to text data,
      analyze the text data to identify keywords in the text data, and
      identify, based on an analysis of the identified keywords, a user of a plurality of users;
   a digital converter, executed by the at least one hardware processor, to
      ascertain a user assistance flow of a plurality of user assistance flows that corresponds to a determined intent of the identified user, and
      cause the voice call to be transferred to a digital assistant that is executed by the at least one hardware processor,
      wherein the digital assistant is to provide artificial intelligence based assistance to the identified user based on the user assistance flow that corresponds to the determined intent; and
   a user profile generator, executed by the at least one hardware processor, to
      ascertain a plurality of attributes for the plurality of users,
      generate, based on an analysis of the plurality of attributes for the plurality of users, scores for the plurality of user assistance flows for each of the plurality of users, wherein each of the scores is determined by rating each of the attributes on a specified scale that includes a plurality of rating levels and determining, based on the rating of each of the attributes, an overall rating for an associated user assistance flow, and wherein at least one attribute of the plurality of attributes is assigned a different weight compared to another attribute of the plurality of attributes for generation of the scores; and determine an intent for each of the plurality of users by identifying, for each of the plurality of users, a user assistance flow of the plurality of user assistance flows that corresponds to a highest score of the plurality of generated scores.

2. The system according to claim 1, wherein the digital converter is to:

generate, based on the determined intent of the identified user, an inquiry to determine whether a purpose of the voice call matches the determined intent; and ascertain, based on a determination that the purpose of the voice call matches the determined intent, the user assistance flow.

3. The system according to claim 2, wherein, based on the determination that the purpose of the voice call matches the determined intent, the digital converter is to generate a further inquiry to determine whether to transfer the voice call to a live user assistant or to the digital assistant, based on a determination that the voice call is to be transferred to the live user assistant, cause the voice call to be transferred to the live user assistant, and based on a determination that the voice call is to be transferred to the digital assistant, cause the voice call to be transferred to the digital assistant.

4. The system according to claim 1, wherein the digital converter is to:

generate, based on the determined intent of the identified user, an inquiry to determine whether a purpose of the voice call matches the determined intent; and based on a determination that the purpose of the voice call does not match the determined intent, the digital converter is to generate a further inquiry to ascertain an intent of the user, and ascertain another user assistance flow of the plurality of user assistance flows that corresponds to the ascertained intent of the user, wherein the digital assistant is to provide artificial intelligence based assistance to the identified user based on the another user assistance flow that corresponds to the ascertained intent of the user.

5. The system according to claim 1, further comprising:

an escalation analyzer, executed by the at least one hardware processor, to ascertain, for the user assistance flow, an erroneous flow component of the user assistance flow, generate, for a knowledge engineer, an inquiry to resolve an error with respect to the erroneous flow component of the user assistance flow, ascertain, from the knowledge engineer, a response to the inquiry to resolve the error with respect to the erroneous flow component of the user assistance flow, and modify, based on the response to the inquiry to resolve the error, the user assistance flow.

6. The system according to claim 1, wherein the digital assistant is to utilize a communication channel that includes a newly configured web portal that includes a newly configured direct network link to provide information to the identified user based on the user assistance flow that corresponds to the determined intent.

7. The system according to claim 1, wherein the digital assistant is to utilize a communication channel that includes an existing web portal that includes an existing direct network link to provide information to the identified user based on the user assistance flow that corresponds to the determined intent.

8. The system according to claim 1, wherein the user profile generator is to determine, based on the rating of each of the attributes, the overall rating for the associated user assistance flow by:

determining, based on the rating of each of the attributes, the overall rating for the associated user assistance flow by averaging ratings for the plurality of attributes.

9. The system according to claim 1, wherein the user profile generator is to determine the intent for each of the plurality of users by identifying, for each of the plurality of users, the user assistance flow of the plurality of user assistance flows that corresponds to the highest score of the plurality of generated scores by:

determining the intent for each of the plurality of users by identifying, for each of the plurality of users, the user assistance flow of the plurality of user assistance flows that corresponds to the highest score that is determined as a score associated with a specified probability.

10. A computer implemented method comprising:

generating, based on an analysis of a plurality of attributes for a plurality of users, scores for a plurality of user assistance flows for each of the plurality of users, wherein each of the scores is determined by rating each of the attributes on a specified scale that includes a plurality of rating levels and determining, based on the rating of each of the attributes, an overall rating for an associated user assistance flow, and wherein at least one attribute of the plurality of attributes is assigned a different weight compared to another attribute of the plurality of attributes for generation of the scores;

determining an intent for each of the plurality of users by identifying, for each of the plurality of users, a user assistance flow of the plurality of user assistance flows that corresponds to a highest score of the plurality of generated scores;

receiving a voice call;

analyzing the voice call to generate voice data;

converting the voice data to text data;

analyzing the text data to identify keywords in the text data;

identifying, based on an analysis of the identified keywords, a user of the plurality of users;

generating, based on a determined intent of the identified user, an inquiry to determine whether a purpose of the voice call matches the determined intent;

based on a determination that the purpose of the voice call matches the determined intent, ascertaining a user assistance flow of the plurality of user assistance flows that corresponds to the determined intent; and causing the voice call to be transferred to a digital assistant that is executed by at least one hardware processor to provide artificial intelligence based assistance to the identified user based on the user assistance flow that corresponds to the determined intent.

11. The method according to claim 10, wherein, based on the determination that the purpose of the voice call matches the determined intent, the method further comprises:

generating a further inquiry to determine whether to transfer the voice call to a live user assistant or to the digital assistant;

based on a determination that the voice call is to be transferred to the live user assistant, causing the voice call to be transferred to the live user assistant; and based on a determination that the voice call is to be transferred to the digital assistant, causing the voice call to be transferred to the digital assistant.

12. The method according to claim 10, wherein, based on a determination that the purpose of the voice call does not match the determined intent, the method further comprises:
generating a further inquiry to ascertain an intent of the user; and
ascertaining another user assistance flow of the plurality of user assistance flows that corresponds to the ascertained intent of the user,
wherein the digital assistant is to provide artificial intelligence based assistance to the identified user based on the another user assistance flow that corresponds to the ascertained intent of the user.

13. A non-transitory computer readable medium having stored thereon machine readable instructions, the machine readable instructions, when executed, cause at least one hardware processor to:
generate, based on an analysis of a plurality of attributes for a plurality of users, scores for a plurality of user assistance flows for each of the plurality of users, wherein each of the scores is determined by rating each of the attributes on a specified scale that includes a plurality of rating levels and determining, based on the rating of each of the attributes, an overall rating for an associated user assistance flow;
determine an intent for each of the plurality of users by identifying, for each of the plurality of users, a user assistance flow of the plurality of user assistance flows that corresponds to a highest score of the plurality of generated scores, wherein at least one attribute of the plurality of attributes is assigned a different weight compared to another attribute of the plurality of attributes for generation of the scores;
ascertain voice data for a voice call;
convert the voice data to text data;
analyze the text data to identify keywords in the text data;
identify, based on an analysis of the identified keywords, a user of the plurality of users;
generate, based on a determined intent of the identified user, an inquiry to determine whether a purpose of the voice call matches the determined intent;
based on a determination that the purpose of the voice call matches the determined intent,
ascertain a user assistance flow of the plurality of user assistance flows that corresponds to the determined intent, and
cause the voice call to be transferred to a digital assistant that is executed by the at least one hardware processor to provide artificial intelligence based assistance to the identified user based on the user assistance flow that corresponds to the determined intent; and
based on a determination that the purpose of the voice call does not match the determined intent,
generate a further inquiry to ascertain an intent of the user,
ascertain another user assistance flow of the plurality of user assistance flows that corresponds to the ascertained intent of the user, and
cause the voice call to be transferred to the digital assistant that is executed by the at least one hardware processor to provide artificial intelligence based assistance to the identified user based on the another user assistance flow that corresponds to the ascertained intent of the user.

14. The non-transitory computer readable medium according to claim 13, wherein the machine readable instructions when executed by the at least one hardware processor, further cause the at least one hardware processor to:
ascertain, for the user assistance flow of the plurality of user assistance flows that corresponds to the determined intent, an erroneous flow component of the user assistance flow;
generate, for a knowledge engineer, an inquiry to resolve an error with respect to the erroneous flow component of the user assistance flow;
ascertain, from the knowledge engineer, a response to the inquiry to resolve the error with respect to the erroneous flow component of the user assistance flow; and
modify, based on the response to the inquiry to resolve the error, the user assistance flow of the plurality of user assistance flows that corresponds to the determined intent.

15. The non-transitory computer readable medium according to claim 13, wherein the machine readable instructions when executed by the at least one hardware processor further cause the at least one hardware processor to:
ascertain, for the another user assistance flow of the plurality of user assistance flows that corresponds to the ascertained intent, an erroneous flow component of the another user assistance flow;
generate, for a knowledge engineer, an inquiry to resolve an error with respect to the erroneous flow component of the another user assistance flow;
ascertain, from the knowledge engineer, a response to the inquiry to resolve the error with respect to the erroneous flow component of the another user assistance flow; and
modify, based on the response to the inquiry to resolve the error, the another user assistance flow of the plurality of user assistance flows that corresponds to the ascertained intent.

16. The non-transitory computer readable medium according to claim 13, wherein the machine readable instructions when executed by the at least one hardware processor further cause the at least one hardware processor to:
utilize a communication channel that includes a newly configured web portal that includes a newly configured direct network link to provide information to the identified user based on the user assistance flow that corresponds to the determined intent.

17. The non-transitory computer readable medium according to claim 13, wherein the machine readable instructions when executed by the at least one hardware processor further cause the at least one hardware processor to:
utilize a communication channel that includes an existing web portal that includes an existing direct network link to provide information to the identified user based on the user assistance flow that corresponds to the determined intent.

18. A system comprising:
a user profile generator, executed by at least one hardware processor, to
ascertain a plurality of attributes for a plurality of users,
generate, based on an analysis of the plurality of attributes for the plurality of users, scores for a plurality of user assistance flows for each of the plurality of users, wherein each of the scores is determined by rating each of the attributes on a specified scale that includes a plurality of rating levels and determining, based on the rating of each of the attributes, an overall rating for an associated user assistance flow, and determine an intent for each of the plurality of users by identifying, for each of the plurality of users, a user assistance flow of the plurality of user assistance flows that corresponds to a highest score of the plurality of generated scores, wherein at least one attribute of the plurality of attributes is assigned a different weight compared to another attribute of the plurality of attributes for generation of the scores.

19. The system according to claim 1, wherein an attribute of the plurality of attributes includes a historical touchpoint attribute associated with a physical place of interaction by the plurality of users.

20. The system according to claim 1, wherein the digital converter is to determine, based on an analysis of a number of known attributes associated with the user, a confidence of the determined intent of the identified user, wherein the confidence includes negative and positive weights assigned to incorrect and correct answers associated with the plurality of attributes.

* * * * *